US007297085B2

(12) United States Patent
Klemen

(10) Patent No.: US 7,297,085 B2
(45) Date of Patent: Nov. 20, 2007

(54) THREE MODE, MULTI-SPEED TRANSMISSION

(75) Inventor: Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 201 days.

(21) Appl. No.: 11/260,875

(22) Filed: Oct. 27, 2005

(65) Prior Publication Data

US 2007/0099741 A1 May 3, 2007

(51) Int. Cl.
 *F16H 3/44* (2006.01)
(52) U.S. Cl. ..................................... 475/280
(58) Field of Classification Search ............... 475/280, 475/288, 290, 329, 330, 903, 207, 218, 219
See application file for complete search history.

(56) References Cited

U.S. PATENT DOCUMENTS 3,118,319 A * 1/1964 Straub ........................ 477/20

| | | | |
|---|---|---|---|
| 5,620,387 A * | 4/1997 | Janiszewski | 475/150 |
| 6,010,422 A * | 1/2000 | Garnett et al. | 475/5 |
| 2006/0063638 A1* | 3/2006 | Sowul et al. | 475/5 |

* cited by examiner

*Primary Examiner*—Roger Pang
*Assistant Examiner*—Edwin A Young

(57) ABSTRACT

An automatic transmission providing modal speed ratios, single transition gear shifting, low internal speeds, and an output lock feature is provided. First, second and third modal torque-transmitting mechanisms are selectively engagable along with first and second input torque-transmitting mechanisms to effect power flow to first and second planetary gear set to cause the speed of a member of one of the gear sets to increase in the first mode (when the first and second input torque-transmitting mechanisms are engaged in successive order while the first modal torque-transmitting mechanism is engaged), decrease in the second mode (when the first and second input torque-transmitting mechanisms are engaged in reverse order while the second modal torque-transmitting mechanism is engaged) and increase in the third mode (when the first and second input torque-transmitting mechanisms are engaged in successive order while the third modal torque-transmitting mechanism is engaged).

20 Claims, 12 Drawing Sheets

| ENGAGED | | | TORQUE RATIO | RATIO STEPS |
|---|---|---|---|---|
| R3 | C | REV | -3.64 | 1.28 |
| R2 | B | REV | -4.65 | 1.31 |
| R1 | A | REV | -6.08 | -0.94 |
| 1 | A | MI | 6.48 | 1.31 |
| 2 | B | MI | 4.96 | 1.28 |
| 3 | C | MI | 3.88 | 1.33 |
| 4 | MII | MI | 2.90 | 1.27 |
| 5 | MII | C | 2.29 | 1.34 |
| 6 | MII | MIII | 1.71 | 1.31 |
| 7 | A | MIII | 1.31 | 1.31 |
| 8 | B | MIII | 1.00 | 1.28 |
| 9 | C | MIII | 0.78 | |

| | ENGAGED | | TORQUE RATIO | RATIO STEPS |
|---|---|---|---|---|
| R2 | C | REV | -2.82 | 1.35 |
| R1 | B | REV | -3.80 | -0.95 |
| 1 | B | MI | 4.00 | |
| 2 | C | MI | 2.97 | 1.35 |
| 3 | MII | MI | 2.19 | 1.36 |
| 4 | MII | C | 1.71 | 1.28 |
| 5 | MII | MIII | 1.35 | 1.27 |
| 6 | B | MIII | 1.00 | 1.35 |
| 7 | C | MIII | 0.74 | 1.35 |

| | ENGAGED | | TORQUE RATIO | RATIO STEPS |
|---|---|---|---|---|
| R3 | C | REV | -2.82 | 1.35 |
| R2 | B | REV | -3.80 | 1.35 |
| R1 | A | REV | -5.12 | -0.95 |
| 1 | A | MI | 5.39 | 1.35 |
| 2 | B | MI | 4.00 | 1.35 |
| 3 | C | MI | 2.97 | 1.36 |
| 4 | MII | MI | 2.19 | 1.28 |
| 5 | MII | C | 1.71 | 1.27 |
| 6 | MII | MIII | 1.35 | 1.35 |
| 7 | B | MIII | 1.00 | 1.35 |
| 8 | C | MIII | 0.74 | |

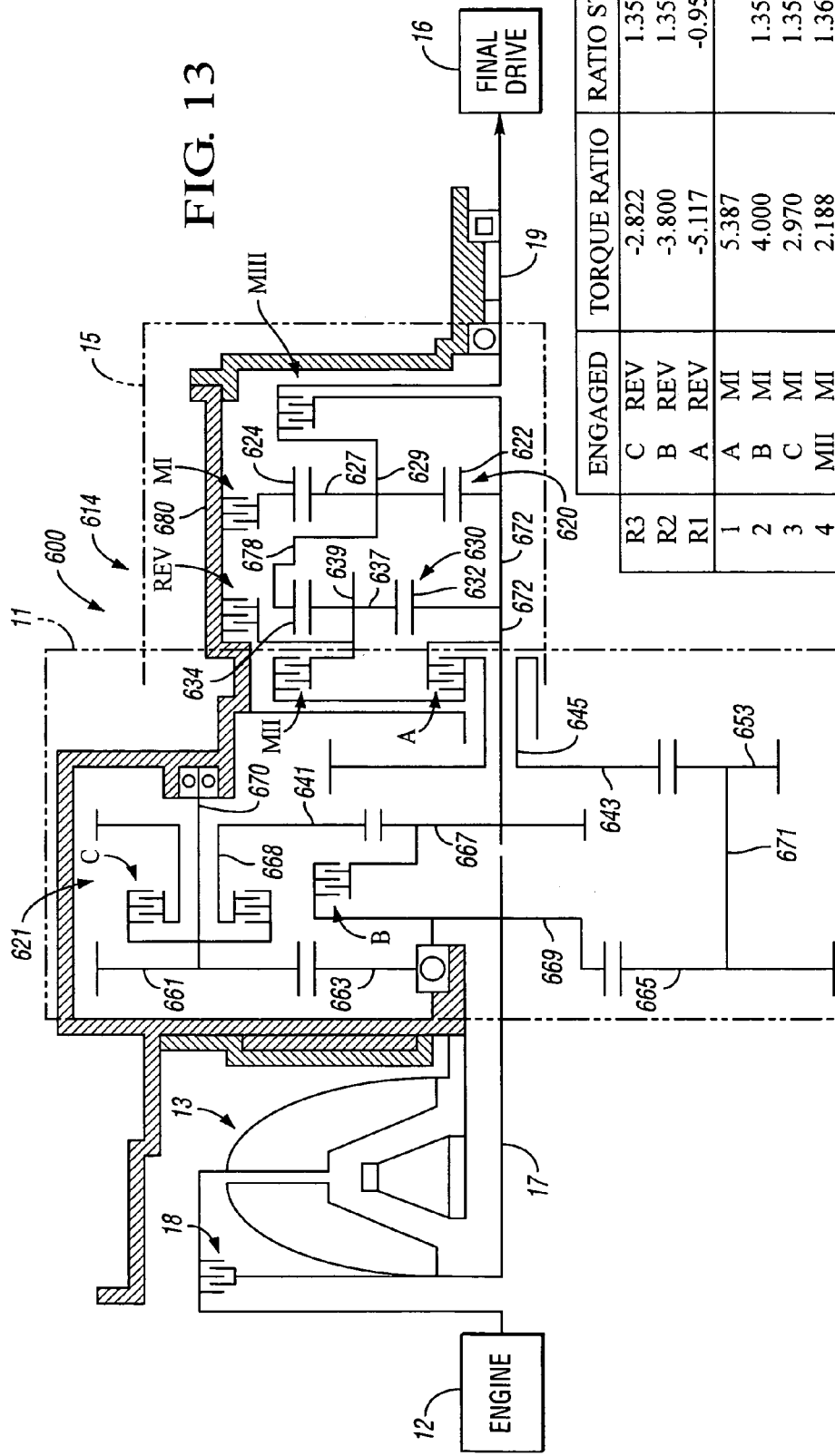

| | ENGAGED | TORQUE RATIO | RATIO STEPS |
|---|---|---|---|
| R3 | C REV | -3.77 | 1.33 |
| R2 | B REV | -5.03 | 1.31 |
| R1 | A REV | -6.57 | -0.99 |
| 1 | A MI | 6.48 | |
| 2 | B MI | 4.96 | 1.31 |
| 3 | C MI | 3.72 | 1.33 |
| 4 | MII MI | 2.83 | 1.32 |
| 5 | MII C | 2.26 | 1.25 |
| 6 | MII MIII | 1.71 | 1.32 |
| 7 | A MIII | 1.31 | 1.31 |
| 8 | B MIII | 1.00 | 1.31 |
| 9 | C MIII | 0.75 | 1.33 |

| ENGAGED | | | TORQUE RATIO | RATIO STEPS |
|---|---|---|---|---|
| R3 | C | REV | −3.88 | 1.307 |
| R2 | B | REV | −5.07 | 1.307 |
| R1 | A | REV | −6.62 | −0.98 |
| 1 | A | MI | 6.75 | |
| 2 | B | MI | 5.17 | 1.31 |
| 3 | C | MI | 3.96 | 1.31 |
| 4 | MII | MI | 2.88 | 1.37 |
| 5 | MII | C | 2.26 | 1.28 |
| 6 | MII | MIII | 1.71 | 1.32 |
| 7 | A | MIII | 1.31 | 1.31 |
| 8 | B | MIII | 1.00 | 1.31 |
| 9 | C | MIII | 0.77 | 1.31 |

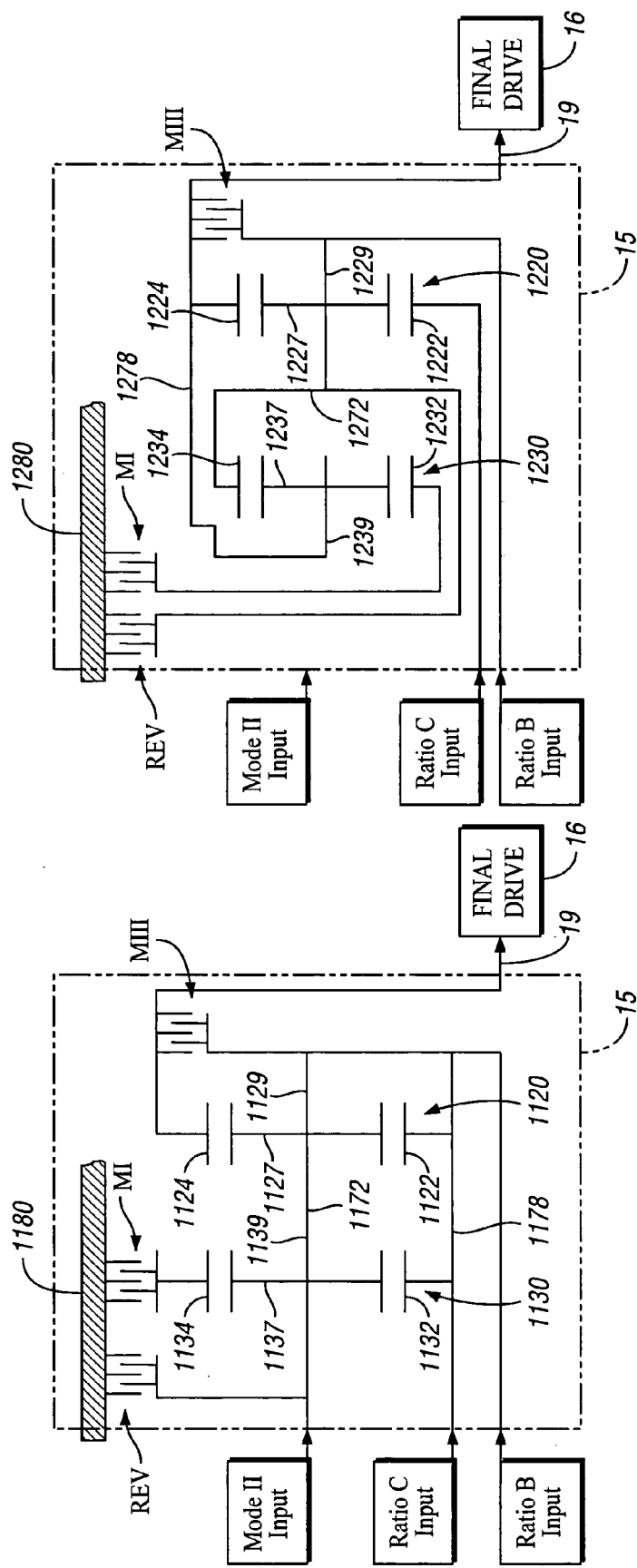

| ENGAGED | | TORQUE RATIO | RATIO STEPS |
|---|---|---|---|
| R2 | C REV | -3.80 | 1.35 |
| R1 | B REV | -5.12 | -0.95 |
| 1 | B MI | 5.387 | |
| 2 | C MI | 4.000 | 1.35 |
| 3 | MII MI | 2.947 | 1.36 |
| 4 | MII C | 2.308 | 1.28 |
| 5 | MII MIII | 1.814 | 1.27 |
| 6 | B MIII | 1.347 | 1.35 |
| 7 | C MIII | 1.000 | 1.35 |

THREE MODE, MULTI-SPEED TRANSMISSION

TECHNICAL FIELD

The present invention relates to a power transmission having at least two planetary gear sets and three modal torque-transmitting mechanisms successively engagable with other torque-transmitting mechanisms to provide three modes of speed ratios with single transition shifts.

BACKGROUND OF THE INVENTION

Currently available transmissions for heavy working machinery typically have a multi-speed "input" section driving into either a two-speed high/low ratio "splitter" section or a three speed high/medium/low ratio "splitter" section. By successively engaging torque-transmitting mechanisms in the input section ("input torque-transmitting mechanisms") with the splitter section torque-transmitting mechanisms a shift sequence is achieved. For instance, if the input section includes torque-transmitting mechanisms A, B, C and the splitter section includes torque-transmitting mechanisms low (L), medium (M) and high (H) then the shift sequence would be AL-BL-CL-AM-BM-CM-AH-BH-CH. This shift sequence has single transition shifting except for two undesirable center shifts, i.e., CL to AM and CM to AH. These are double transition shifts which compromise shift quality, shift time and durability of the internal gears.

SUMMARY OF THE INVENTION

The present invention provides an improved transmission, especially for heavy working machinery, with a high number of ratios, very uniform steps and low internal speeds. The transmission has two "rear" planetary gear sets that are uniquely constructed to provide modal operation as explained herein. A "front" section provides power flow input to the rear planetary gear sets using either a modal torque-transmitting mechanism or an input torque-transmitting mechanism, providing multiple input speed ratios. The rear two planetary gear sets are operatively connected with two other modal torque-transmitting mechanisms and a reverse brake. The transmission provides up to three ratios in a first mode, a first transition speed ratio between the first mode and the second mode, up to three additional speed ratios in the second mode, a second transition speed ratio between the second mode and a third mode, and up to three speed ratios in the third mode. Thus, if three input torque-transmitting mechanisms are provided, potentially eleven speed ratios (or corresponding torque ratios) may be achieved. Up to three reverse ratios may be achieved. The third mode speed ratios may include one or more overdrive ratios or the transmission may operate without overdrive depending on gear tooth counts selected.

In the transmission, input to the rear planetary gear sets from the multi-speed input torque-transmitting mechanisms increases in the first mode, decreases in the second mode and increases again in the third mode.

Specifically, an automatic transmission is provided that has first and second planetary gear sets (the rear planetary gear sets) each having a first member, a second member and a third member. A first modal torque-transmitting mechanism is selectively engagable to connect one of the members of the first planetary gear set with a stationary member such as the transmission housing. A second modal torque-transmitting mechanism is selectively engagable to establish power flow to a member of the second planetary gear set. A third modal torque-transmitting mechanism is selectively engagable to connect any two members of one of the first and second planetary gear sets. First and second input torque-transmitting mechanisms are separately selectively engagable to establish power flow at a different member of one of the first and second planetary gear sets than the member at which power flow is established via engagement of the second modal torque-transmitting mechanism. The speed of the member at which power flow is established by engagement of the first or the second input torque-transmitting mechanism increases, then decreases, then increases, respectively, as the first and second input torque-transmitting mechanisms are engaged in successive order while the first modal torque-transmitting mechanism is engaged, in reverse order while the second modal torque-transmitting mechanism is engaged, and in successive order while the third modal torque-transmitting mechanism is engaged.

A plurality of gear members (the front section) include a first gear member continuously connected with the input member, a second gear member continuously connected with the member that increases, then decreases, then increases in speed as described above, and a third gear member continuously connected with the member at which power flow is established via engagement of the second modal torque-transmitting mechanism. As used herein, 'gear member' within the claimed plurality of gear members may include a ring gear member, a sun gear member or a pinion gear member and may also include a carrier member which rotatably supports the pinion gear members.

The transmission has an input member and an output member. Preferably, the first and second input torque-transmitting mechanisms are engagable in successive order while the first modal torque-transmitting mechanism is engaged to establish respectively increasing first modal speed ratios between the input member and the output member, in reverse order while the second modal torque-transmitting mechanism is engaged to establish respectively increasing second modal speed ratios between the input member and the output member, and in successive order while the third modal torque-transmitting mechanism is engaged to establish respectively increasing third modal speed ratios between the input member and the output member. Speed ratio, as used herein, is the ratio of the speed of the output member to the speed of the input member. Torque ratio is the ratio of the torque of the output member to the torque of the input member. As torque ratio decreases, speed ratio increases.

Additionally, the first and second modal torque-transmitting mechanisms may be simultaneously engagable to establish a first transition speed ratio between the input member and the output member, with a single transition shift between the first transition speed ratio and both of said first and second modal speed ratios. The first transition speed ratio has a numerical value greater than the first modal speed ratio and less than the second modal speed ratio. Similarly, the second modal torque-transmitting mechanism and the third modal torque-transmitting mechanism may be simultaneously engaged to establish a second transition speed ratio between the input member and the output member, with a single transition shift between the second transition speed ratio and both of the second and third modal speed ratios. The second transition speed ratio has a numerical value greater than the second modal speed ratio and less than the third modal speed ratio. The ability of the transmission to provide the first and second transition speed ratios eliminates undesirable double transition shifts typically encountered with transmissions having a "splitter" section.

Preferably a third input torque-transmitting mechanism is provided that is selectively engagable to establish power flow at the same gear member at which the first and second input torque-transmitting mechanisms establish power flow. The third input torque-transmitting mechanism is engagable with the first modal torque-transmitting mechanism, with the second modal torque-transmitting mechanism and with the third modal torque-transmitting mechanism to establish another first modal speed ratio, another second modal speed ratio and another third modal speed ratio, respectively.

Preferably, a reverse torque-transmitting mechanism is provided that is selectively engagable to connect one of the members of the second planetary gear set with the stationary member. The first, second and the third input torque-transmitting mechanisms are successively engagable while the reverse torque-transmitting mechanism is engaged to establish different reverse speed ratios between the input member and the output member.

The reverse torque-transmitting mechanism enables an unique lock-out feature. Specifically, engagement of the reverse torque-transmitting mechanism with the first modal torque-transmitting mechanism prevents rotation of the output member to prevent rolling on steep grades.

The input torque-transmitting mechanisms may be operatively connected to additional planetary gear sets or to gears in a counter-shaft layout located between the input member and the first and second planetary gear sets. If three input torque-transmitting mechanisms are provided, up to eleven speed ratios may be achieved, although as few as seven may be utilized depending on the step and ratios desired. For instance, a direct, single overdrive or dual overdrive top ratio may be utilized. The rear planetary gear sets (i.e., the first and second planetary gear sets) have two separate interconnected pairs of members. Additionally, the first modal torque-transmitting mechanism connects one of the members of the first planetary gear set with the stationary member. The transmission provides very deep start ratios.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 13 is a schematic representation of a powertrain incorporating a sixth embodiment of the transmission of the present invention;

FIG. 14 is a chart depicting some of the operating characteristics of the powertrain shown in FIG. 13;

FIG. 21 is a schematic representation of two rear planetary gear sets of an eleventh embodiment of the transmission of the present invention;

FIG. 22 is a schematic representation of two rear planetary gear sets of a transmission depicting a twelfth embodiment of the present invention;

DESCRIPTION OF THE PREFERRED EMBODIMENTS

Schematic Block Diagram of the Transmission

Figure 1:
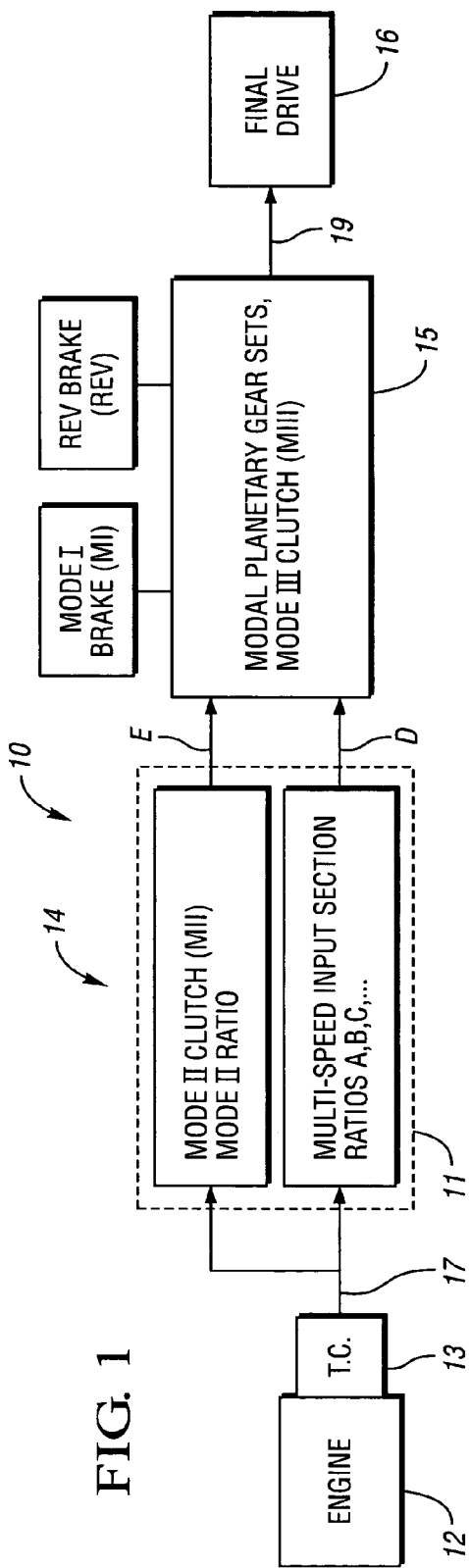
FIG. 1 is a schematic block diagram representation of a powertrain including the transmission of the present invention.

Referring to the drawings, wherein like reference numbers represent the same or corresponding parts through out the several views, a powertrain 10 shown in FIG. 1 in block diagram form, is representative of each of the specific transmission embodiments described below. The powertrain 10 has an engine 12 and torque converter 13, a transmission 14 and a final drive mechanism 16. The transmission 14 includes an input member or shaft 17 continuously connected with the engine 12, (either directly or through the torque converter 13) and an output member of shaft 19 is continuously connected with a final drive mechanism 16. The planetary transmission 14 includes a front section 11 (also referred to as an input section) configured to establish power flow to a rear section 15 (also referred to as an output section) to establish various speed ratios between the input member 17 and the output member 19. The front section 11 may be comprised of planetary gear sets or may be a countershaft gear arrangement. The rear section 15 includes first and second planetary gear sets which may be referred to herein as modal planetary gear sets. The front section 11 includes multiple input section torque-transmitting mechanisms A, B, and C, as well as a second mode clutch (MII). The rear section 15 includes a first mode brake (MI) engagable to ground a member of one of the modal planetary gear sets to the transmission housing. The rear section 15 also includes a reverse brake (REV) selectively engagable to ground different members of the modal planetary gear sets to the transmission housing. Additionally, a third mode clutch (MIII) is selectively engagable to connect any two members of one of the modal planetary gear sets. When only one of the input section torque-transmitting mechanisms A, B or C is engaged and clutch MII is not engaged, power flow is established between the front section 11 and the rear section 15 only along power flow path D. If the MII clutch is engaged and none of the input torque-transmitting mechanisms A, B, C are engaged, power flow is established between the front section 11 and the rear section 15 only along the power flow path E. If clutch MII is engaged along with one of the input torque-transmitting mechanisms, A, B or C, power flow is established between the front section 11 and the rear section 15 is along both power flow paths D and E.

Eleven potential forward speed ratios may be achieved in the transmission 14 by the following engagement schedule:

A, MI; B, MI; C, MI-MI, MII-MII, C; MII, B; MII, A-MII, MIII-MIII, A; MIII, B; MIII, C

Three reverse speed ratios are achieved by engaging REV and A, REV and B, and REV and C. The first three forward speed ratios, established by engaging A and MI, B and MI and C and MI, establish a first mode, Mode I; the fifth sixth, and seventh ratios established by engaging C and MII, B and MII, and A and MII establish a second mode, Mode II. The ninth, tenth and eleventh speed ratios established by engaging A and MIII, B and MIII, and C and MIII, establish a third mode, MIII. The fourth speed ratio established by engagement of the brake MI and the clutch MII is a first transition speed ratio with a numerical value greater than the Mode I ratios and less than the Mode II ratios. The eighth speed ratio established by engaging the clutch MII and the clutch MIII establishes a second transition mode speed ratio with a numerical value greater than the second mode speed ratios and less than the third mode speed ratios. The modal nature of the engagement schedule allows for the single transition shifts utilized. Under this engagement schedule, the member of the modal planetary gear set which receives power flow from the front section 11 along power flow path D increases in speed during Mode I, decrease in speed during Mode II and increases in speed again during Mode III. The modal nature of the transmission 14 is also present in each of the transmission embodiments depicted in FIGS. 2-24, as described below.

First Transmission Embodiment

Figures 2, 3:
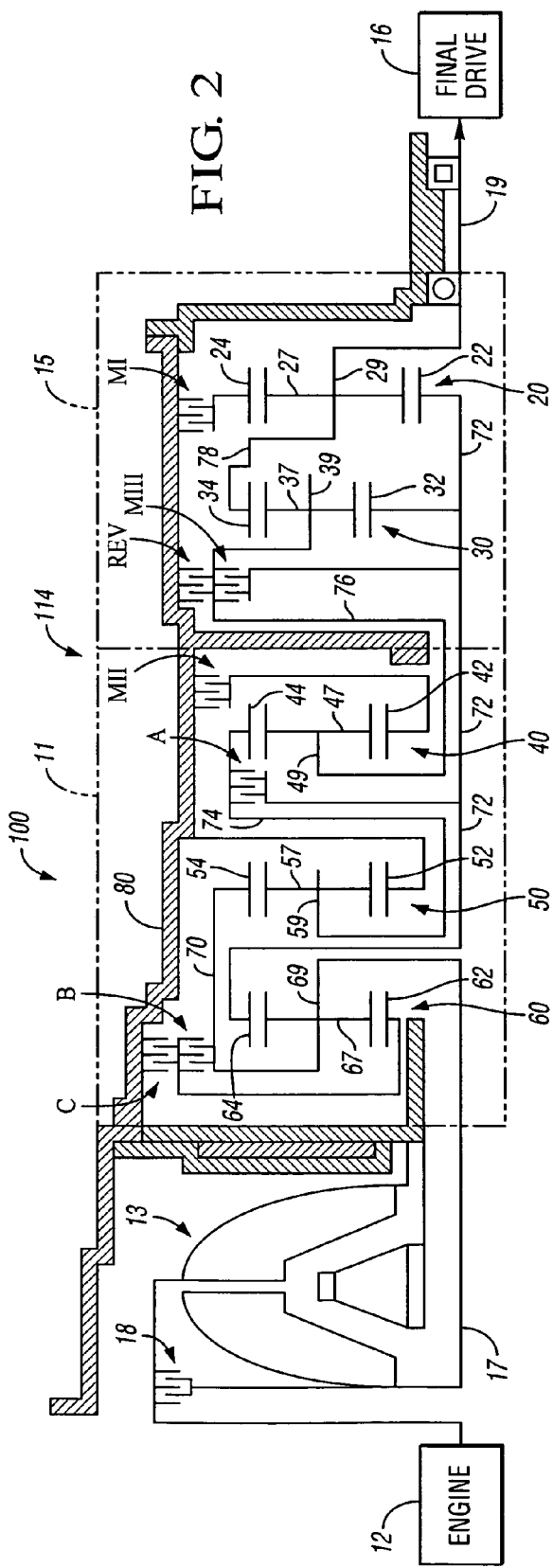
FIG. 2 is a schematic representation of a powertrain including one embodiment of the transmission of the present invention.
FIG. 3 is a chart depicting some of the operating characteristics of a powertrain shown in FIG. 2.

Referring to FIG. 2, a powertrain 100 has an engine 12, a torque converter 13, a transmission 114 and a final drive mechanism 16. The transmission 114 may be characterized by front section 11 and rear section 15.

The transmission 114 includes an input shaft 17 continuously connected to the engine 12 either through the torque converter 13 or by engagement of a torque converter lock-up clutch 18 which effectively bypasses the torque converter 13. The output shaft 19 is continuously connected with the final drive mechanism 16. The transmission 114 includes five planetary gear sets 20, 30, 40, 50 and 60. The planetary gear set 20 is referred to in the claims as the first planetary gear set and the planetary gear set 30 is referred to in the claims as the second planetary gear set. The planetary gear sets 20 and 30 are part of the rear section 15 and the planetary gear sets 40, 50 and 60 are considered part of the front section 11 and are referred to in the claims as a plurality of gear members.

The planetary gear set 20 includes a sun gear member 22, a ring gear member 24 and a carrier member 29 on which a plurality of pinion gears 27 are rotatably supported and disposed in meshing relationship with both the sun gear member 22 and the ring gear member 24.

The planetary gear set 30 includes a sun gear member 32, a ring gear member 34 and a carrier member 39 on which a plurality of pinion gears 37 are rotatably supported and disposed in meshing relationship with the sun gear member 32 and the ring gear member 34.

The planetary gear set 40 includes a sun gear member 42, a ring gear member 44 and a carrier member 49 on which a plurality of pinion gear 47 are rotatably supported in meshing relationship with both the sun gear member 42 and the ring gear member 44.

The planetary gear set 50 includes a sun gear member 52, a ring gear member 54, and a carrier member 59 which rotatably supports a plurality of pinion gears 57 that are disposed in meshing relationship with both the sun gear member 52 and the ring gear member 54.

The planetary gear set 60 includes a sun gear member 62, ring gear member 64 and a carrier member 69 which rotatably supports a plurality of pinion gears 67 that are disposed in meshing relationship with both the sun gear member 62 and the ring gear member 54.

The input shaft 17 is continuously connected with the carrier member 69. The carrier member 69 is continuously connected with the ring gear member 54 through an interconnecting member 70. The ring gear member 64 is continuously connected with the sun gear member 32 as well as the sun gear member 22 through an interconnecting member 72. The interconnecting member 72, as with all other interconnecting members, may be one component or separate components. The carrier member 59 is continuously connected with the ring gear member 44 though an interconnecting member 74. The carrier member 49 is continuously connected with the carrier member 39 through an interconnecting member 76. The ring gear member 34 is continuously connected with the carrier member 29 through an interconnecting member 78. The sun gear member 32 is continuously connected with the sun gear member 22 through the interconnecting member 72. The sun gear member 52 is continuously connected with the transmission housing 80.

The ring gear member 64 and the sun gear members 22 and 32 are selectively connectable with the carrier member 59 and the ring gear member 44 through an input torque-transmitting mechanism clutch A. The sun gear member 62 is selectively connectable with the carrier member 69 and with the ring gear member 54 through the input torque-transmitting mechanism clutch B. The sun gear member 62 is selectively grounded to the transmission housing 80 (a stationary member) through the input torque-transmitting mechanism brake C.

A first modal torque-transmitting mechanism, brake MI, selectively connects the ring gear member 24 with the transmission housing 80. A second modal torque-transmitting mechanism, brake MII, selectively connects the sun gear member 42 with the transmission housing 80. A third modal torque-transmitting mechanism, clutch MIII, selectively connects the sun gear member 32 (and the sun gear member 22) with carrier member 39 (and with carrier member 49 via interconnecting member 76). A reverse torque-transmitting mechanism, brake REV, selectively connects the carrier member 39 (and therefore also carrier member 49 via interconnecting member 76) with the transmission housing 80.

As shown in FIG. 3, the torque-transmitting mechanisms are selectively engaged in combinations of two to provide nine forward speed ratios and three reverse ratios. (Torque ratios are listed; those skilled in the art will readily understand the relationship between torque ratio and speed ratio (i.e., as torque ratios successively decrease, speed ratios successively increase). The torque-transmitting mechanisms are preferably multiple disk-type, fluid actuated friction drive establishing devices which are commonly used in planetary gear transmissions.

The third reverse speed ratio, R3, is established with the engagement of the brake C and the brake REV. The brake C connects the sun gear member 62 with the transmission housing 80, and the brake REV connects the carrier members 39 and 49 with the transmission housing 80. The carrier member 69 and the ring gear member 54 rotate at the same speed as the input shaft 17. The sun gear member 62, sun gear member 52, carrier member 49, and carrier member 39 do not rotate. Ring gear member 64 rotates at the same speed as sun gear member 32 and sun gear member 22. Ring gear member 64 rotates at a speed determined from the speed of the carrier 69 and the ring gear/sun gear tooth ratio of the planetary gear set 60. Ring gear member 34 and carrier member 29 rotate at the same speed as the output member 19. Ring gear member 34, and therefore the output member 19, rotates at a speed determined from the speed of the sun gear member 32 and the ring gear/sun gear tooth ratio of the planetary gear set 30. The numerical value of the third reverse (R3) speed ratio is determined utilizing the ring gear/sun gear tooth ratios of the planetary gear sets 30 and 60.

The second reverse speed ratio (R2) is established with the engagement of the clutch B and the brake REV. The clutch B connects the carrier member 69 with the sun gear member 62, and the brake REV connects the carrier member 39 with the transmission housing 80. The planetary gear set 60, the ring gear member 54, the sun gear member 32 and the sun gear member 22 rotate at the same speed as the input member 17. The sun gear member 52 and the carrier members 49 and 39 do not rotate. The ring gear member 34 and the carrier member 29 rotate at the same speed as the output member 19. The ring gear member 34, and therefore the output member 19, rotates at a speed determined from the speed of the sun gear member 32 and the ring gear/sun gear tooth ratio of the planetary gear set 30. The numerical value of the second reverse (R2) speed ratio is determined utilizing the ring gear/sun gear tooth ratio of the planetary gear set 30.

The first reverse speed ratio (R1) is established with the engagement of the clutch A and the brake REV. The clutch A connects the ring gear member 44 with the sun gear member 32 and the brake REV connects the carrier member 39 with the transmission housing 80. The carrier member 69 and the ring gear member 54 rotate at the same speed as the input member 17. The ring gear member 64 rotates at the same speed as the sun gear member 32, the sun gear member 22, the carrier member 59 and the ring gear member 44. The sun gear member 52 and the carrier members 49 and 39 do not rotate. The carrier member 59 rotates at a speed determined from the ring gear member 54 and the ring gear/sun gear tooth ratio of the planetary gear set 50. The ring gear member 34 and the carrier member 29 rotate at the same speed as the output member 19. The ring gear member 34, and therefore the output member 19, rotates at a speed determined from the speed of the sun gear member 32 and the ring gear/sun gear tooth ratio of the planetary gear set 30. The numerical value of the first reverse (R1) speed ratio is determined utilizing the ring gear/sun gear tooth ratios of the planetary gear sets 30 and 50.

The first forward speed ratio is established with the engagement of the clutch A and the brake MI. The clutch A connects the ring gear member 44 with the sun gear member 32 (and the sun gear member 22), and the brake MI connects the ring gear member 24 with the transmission housing 80. The carrier member 69 and the ring gear member 54 rotate at the same speed as the input member 17. The carrier member 59 rotates at the same speed as the ring gear member 44, the sun gear members 22 and 32, and the ring gear member 64. The sun gear member 52 and the ring gear member 24 do not rotate. The carrier member 59 and sun gear member 22 rotate at a speed determined from the speed of the ring gear member 54 and the ring gear/sun gear tooth ratio of the planetary gear set 50. The carrier member 29 rotates at the same speed as the output member 19. The carrier member 29, and therefore the output member 19, rotates at a speed determined from the speed of the sun gear member 22 and the ring gear/sun gear tooth ratio of the planetary gear set 20. The numerical value of the first forward speed ratio is determined utilizing the ring gear/sun gear tooth ratios of the planetary gear sets 20 and 50.

The second forward-speed ratio is established with the engagement of the clutch B and the brake MI. The clutch B connects the carrier member 69 with the sun gear member 62, and the brake MI connects the ring gear member 24 with the transmission housing 80. The planetary gear set 60, the ring gear member 54 and the sun gear members 22 and 32 rotate at the same speed as the input member 17. The sun gear member 52 and the ring gear member 24 do not rotate. The carrier member 49 rotates at the same speed as the carrier member 39. The ring gear member 34 and the carrier member 29 rotate at the same speed as the output member 19. The carrier member 39 rotates at a speed determined from the speed of the ring gear member 34, the speed of the sun gear member 32 and the ring gear/sun gear tooth ratio of the planetary gear set 30. The carrier member 29, and therefore the output member 19, rotates at a speed determined from the sun gear member 22 (driven the same speed as input member 17) and the ring gear/sun gear tooth ratio of the planetary gear set 20. The numerical value of the second forward speed ratio is determined utilizing the ring gear/sun gear tooth ratio of the planetary gear set 20.

The third forward speed ratio is established with the engagement of the brake C and the brake MI. The brake C connects the sun gear member 62 with transmission housing 80, and the brake MI connects the ring gear member 24 with the transmission housing 80. The carrier member 69 and the ring gear member 54 rotate at the same speed as the input member 17. The ring gear member 64 rotates at the same speed as the sun gear member 22 and the sun gear member 32. The sun gear members 52 and 62 and the ring gear member 24 do not rotate. The ring gear member 64 rotates at a speed determined from the carrier member 69 and the ring gear/sun gear tooth ratio of the planetary gear set 60. The carrier member 59 rotates at the same speed as the ring gear member 44. The carrier member 59 rotates at a speed determined from the speed of the ring gear member 54 and the ring gear/sun gear tooth ratio of the planetary gear set 50. The carrier member 49 rotates at the same speed as the carrier member 39. The ring gear member 34 and the carrier member 29 rotate at the same speed as the output member 19. The carrier member 39 rotates at a speed determined from the speed of the ring gear member 34, the speed of the sun gear member 32 and the ring gear/sun gear tooth ratio of the planetary gear set 30. The carrier member 29, and therefore the output member 19, rotates at a speed determined from the speed of the sun gear member 22 (which is the same as the speed of the ring gear member 64) and the ring gear/sun gear tooth ratio of the planetary gear set 20. The numerical value of the third forward speed ratio is determined utilizing the ring gear/sun gear tooth ratios of the planetary gear sets 20 and 60.

The fourth forward speed ratio is established with the engagement of the brakes MI and MII. The brake MI connects the ring gear member 24 with the transmission housing 80, and the brake MII connects the sun gear member 42 with the transmission housing 80. The carrier member 69 and the ring gear member 54 rotate at the same speed as the input member 17. The sun gear members 42 and 52 and the ring gear member 24 do not rotate. The carrier member 59 rotates at the same speed as the ring gear member 44. The carrier member 59 rotates at a speed determined from the speed of the ring gear member 54 and the ring gear/sun gear tooth ratio of the planetary gear set 50. The carrier member 49 rotates at the same speed as the carrier member 39. The carrier member 49 rotates at a speed determined from the speed of the ring gear member 44 and the ring gear/sun gear tooth ratio of the planetary gear set 40. The sun gear member 22 and the sun gear member 32 rotate at the same speed as the ring gear member 64. The ring gear member 34 and the carrier member 29 rotate at the same speed as the output member 19. The ring gear member 34 rotates at a speed determined from the speed of the carrier member 39, the speed of the sun gear member 32 and the ring gear/sun gear tooth ratio of the planetary gear set 30. The carrier member 29, and therefore the output member 19, rotates at a speed determined from the speed of the sun gear member 22 and the ring gear/sun gear tooth ratio of the planetary gear set 20. The numerical value of the fourth forward speed ratio is determined utilizing the ring gear/sun gear tooth ratios of the planetary gear sets 20, 30, 40 and 50.

The fifth forward speed ratio is established with the engagement of the brake C and the brake MII. The brake C connects the sun gear member 62 with the transmission housing 80, and the brake MII connects the sun gear member 42 with the transmission housing 80. The carrier member 69 and the ring gear member 54 rotate at the same speed as the input member 17. The sun gear members 42, 52 and 62 do not rotate. The carrier member 59 rotates at the same speed as the ring gear member 44. The carrier member 59 rotates at a speed determined from the speed of the ring gear member 54 and the ring gear/sun gear tooth ratio of the planetary gear set 50. The carrier member 49 rotates at the same speed as the carrier member 39. The carrier member 49 rotates at a speed determined from the speed of the ring gear member 44 and the ring gear/sun gear tooth ratio of the planetary gear set 40. The sun gear members 22 and 32 rotate at the same speed as the ring gear member 64. The ring gear member 34 and the carrier member 29 rotate at the same speed as the output member 19. The ring gear member 34, and therefore the output member 19, rotates at a speed determined from the speed of the carrier member 39, the speed of the sun gear member 32 and the ring gear/sun gear tooth ratio of the planetary gear set 30. The numerical value of the fifth forward speed ratio is determined utilizing the ring gear/sun gear tooth ratios of the planetary gear sets 30, 40, 50 and 60.

The sixth forward speed ratio is established with the engagement of the brake MII and the clutch MIII. The brake MII connects the sun gear member 42 with the transmission housing 80, and the clutch MIII connects the carrier member 39 with the sun gear member 32. The carrier member 69 and the ring gear member 54 rotate at the same speed as the input member 17. The carrier member 59 rotates at the same speed as the ring gear member 44. The sun gear members 42 and 52 do not rotate. The carrier member 59 rotates at a speed determined from the speed of the ring gear member 54 and the ring gear/sun gear tooth ratio of the planetary gear set 50. The carrier member 49, the planetary gear set 30, the sun gear member 22 and the ring gear member 64 rotate at the same speed as the output member 19. The carrier member 49, and therefore the output member 19, rotates at a speed determined from the speed of the ring gear member 44 and the ring gear/sun gear tooth ratio of the planetary gear set 40. The numerical value of the sixth forward speed ratio is determined utilizing the ring gear/sun gear tooth ratios of the planetary gear sets 40 and 50.

The seventh forward speed ratio is established with the engagement of the clutch A and the clutch MIII. The clutch A connects the ring gear member 44 with the sun gear member 32 and the clutch MIII connects the carrier member 39 with the sun gear member 32. The carrier member 69 and the ring gear member 54 rotate at the same speed as the input member 17. The carrier member 59, the ring gear member 44, the carrier member 49, the planetary gear set 30, the sun gear member 22 and the carrier member 29 rotate at the same speed as the output member 19. The sun gear member 52 does not rotate. The carrier member 59, and therefore the output member 19, rotates at a speed determined from the speed of the ring gear member 54 and the ring gear/sun gear tooth ratio of the planetary gear set 50. The numerical value of the seventh forward speed ratio is determined utilizing the ring gear/sun gear tooth ratio of the planetary gear set 50.

The eighth forward speed ratio is established with the engagement of the clutch MIII and the clutch B. The clutch B connects the carrier member 69 with the sun gear member 62, and the clutch MIII connects the carrier member 39 with the sun gear member 32. The planetary gear set 60, the planetary gear set 30, the sun gear member 22 and the carrier member 29 rotate at the same speed as the input member 17. Because the carrier member 29 also rotates at the same speed as the output member 19, the input member 17 rotates at the same speed as the output member 19 in this configuration, providing a direct drive ratio.

The ninth forward speed ratio is established with the engagement of the brake C and the clutch MIII. The brake C connects the sun gear member 62 with the transmission housing 80, and the clutch MIII connects the carrier member 39 with the sun gear member 32. The carrier member 69 and the ring gear member 54 rotate at the same speed as the input member 17. The ring gear member 64, the planetary gear set 30, the sun gear member 22 and the carrier member 29 rotate at the same speed as the output member 19. The ring gear member 64, and therefore the output member 19, rotates at a speed determined from the speed of the carrier member 69 and the ring gear/sun gear tooth ratio of the planetary gear set 60. The numerical value of the ninth forward speed ratio is determined utilizing the ring gear/sun gear tooth ratio of the planetary gear set 60.

The engagement schedule for the torque-transmitting mechanisms in the transmission 114 of FIG. 2 is shown in the chart of FIG. 3. Chart of FIG. 3 also provides an example of torque ratios that are available utilizing the ring gear/sun gear tooth ratios as follows: the ring gear/sun gear tooth ratio of the planetary gear set 20 is 3.96; the ring gear/sun gear tooth ratio of the planetary gear set 30 is 4.65; the ring gear/sun gear tooth ratio of the planetary gear set 40 is 3.26; the ring gear/sun gear tooth ratio of the planetary gear set 50 is 3.26; and the ring gear/sun gear tooth ratio of the planetary gear set 60 is 3.57.

Also, the chart of FIG. 3 describes the ratio steps that are obtained utilizing the tooth ratio values listed above. For example, the step ratio between the first and second forward torque ratio is 1.31, while the step ratio between the second and third forward torque ratio is 1.28. It is apparent from FIG. 3 that the first three forward speed ratios are established with the engagement of the first mode brake MI while the input torque-transmitting mechanisms A, B and C are engaged in succeeding order. The fourth, fifth and sixth speed ratios are attained with the engagement of the second mode brake MII. The fourth forward speed ratio is a transition speed ratio in which the brake MI and the clutch MII are engaged, while the sixth forward speed ratio is a transition ratio in which the clutch MII and the brake MIII are engaged. The seventh, eighth and ninth forward speed ratios establish the third mode in which the clutch MIII is engaged while the input torque-transmitting mechanisms A, B and C are engaged in succeeding order. Only the ninth forward speed ratio is an overdrive ratio. Accordingly, as most of the forward speed ratios are underdrive ratios, lower internal speeds are maintained. Alternatively, the highest speed ratio could be an overdrive ratio, or two overdrive ratios could be provided, depending on engine speeds, vehicle speeds, axles available, and internal design considerations. Single transition shifts are employed in the forward speed ratios as well as the reverse speed ratios as is evident from FIG. 3.

The transmission 114 of FIG. 2 is able to "lock" the output member 19 by engaging the brake REV and the brake MI. If a vehicle having transmission 114 is parked on a grade, wheels interconnected with the output member 19 will transfer a gravity-induced torque to the output member 19, which may attempt to rotate the carrier member 29. If the output member 19 attempts to rotate in a clockwise direction, the carrier member 29 and the ring gear member 34, interconnected by interconnecting member 78, will attempt to also rotate in a clockwise direction. Because the ring gear member 24 is braked by brake MI, this will cause the sun gear member 22 to attempt to rotate in a clockwise direction as well. With the ring gear member 34 attempting to rotate in a clockwise direction, because the carrier member 39 is braked by brake REV, the pinion gears 37 will attempt to rotate in a clockwise direction, causing the sun gear member 32 to attempt to rotate in a counter-clockwise direction. Because the interconnecting member 79 connects the sun gear member 22 with the sun gear member 32, with the sun gear member 22 attempting to rotate in a clockwise direction, and the sun gear member 32 attempting to rotate in a counter-clockwise direction, rotation is prevented.

It is apparent from the above descriptions of the respective torque ratios listed in FIG. 3 that the engagement of any of the input torque-transmitting mechanisms A, B or C affects power flow to and therefore the speed of the sun gear member 32. The power flow to the sun gear member 32 is along the interconnecting member 72 which is comparable to the torque flow path D of FIG. 1. When the brake MII is engaged, power flow from the front section 11 to the rear section 15 is affected through the interconnecting member 76 as the planetary gear set 40 is made active. Interconnecting member 76 is comparable to the power flow path E of FIG. 1. With respect to the claims, carrier member 69 is the first gear member, ring gear member 64 is the second gear member and carrier member 49 is the third gear member.

Figure 4:
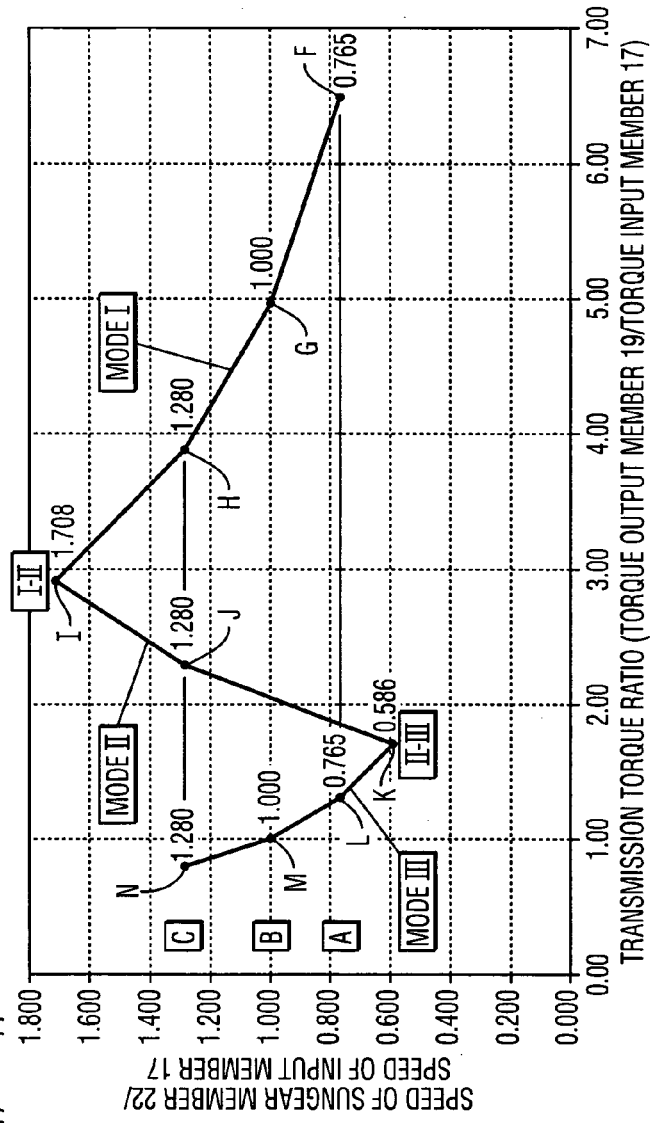
FIG. 4 is a chart showing the speed of one of the sun gear members of the transmission of FIG. 2 versus the transmission torque ratio of the transmission of FIG. 2 at different torque ratios established by engagement of selected ones of modal torque-transmitting mechanisms and input torque-transmitting mechanisms included in the transmission.

Referring now to FIG. 4, the ratio of the speed of the sun gear member 22 to the speed of the input member 17 in the transmission 114 of FIG. 2 is plotted versus torque ratio (i.e., the torque of the output member 19 with respect to the torque of the input member 17). Each of the nine forward speed ratios (corresponding to torque ratios indicated in FIG. 3) is plotted in FIG. 4 as follows: point F represents the first speed ratio, point G represents the second speed ratio, point H represents the third speed ratio, point I represent the fourth speed ratio, point J represents the fifth speed ratio, point K represents the sixth speed ratio, point L represents the seventh speed ratio, point M represents the eighth speed ratio and point N represents the ninth speed ratio. Thus, points F, G and H represent the first modal speed ratios (establishing the first mode) while point I represents the first transition speed ratio, the fourth speed ratio. Point J represents a second modal speed ratio (establishing the second mode) while point K represents the second transition speed ratio, the sixth forward speed ratio. Points L, M and N represent third modal speed ratios (establishing the third mode). It is evident from the chart of FIG. 4 that the ratio of the speed of the sun gear member 32 to the speed of the input member 17 increases in the first mode, reaches a maximum at the first transition speed ratio, decreases in the second mode, reaches a minimum at the second transition speed ratio and increases again during the third mode.

Second Transmission Embodiment

Figures 5, 6:
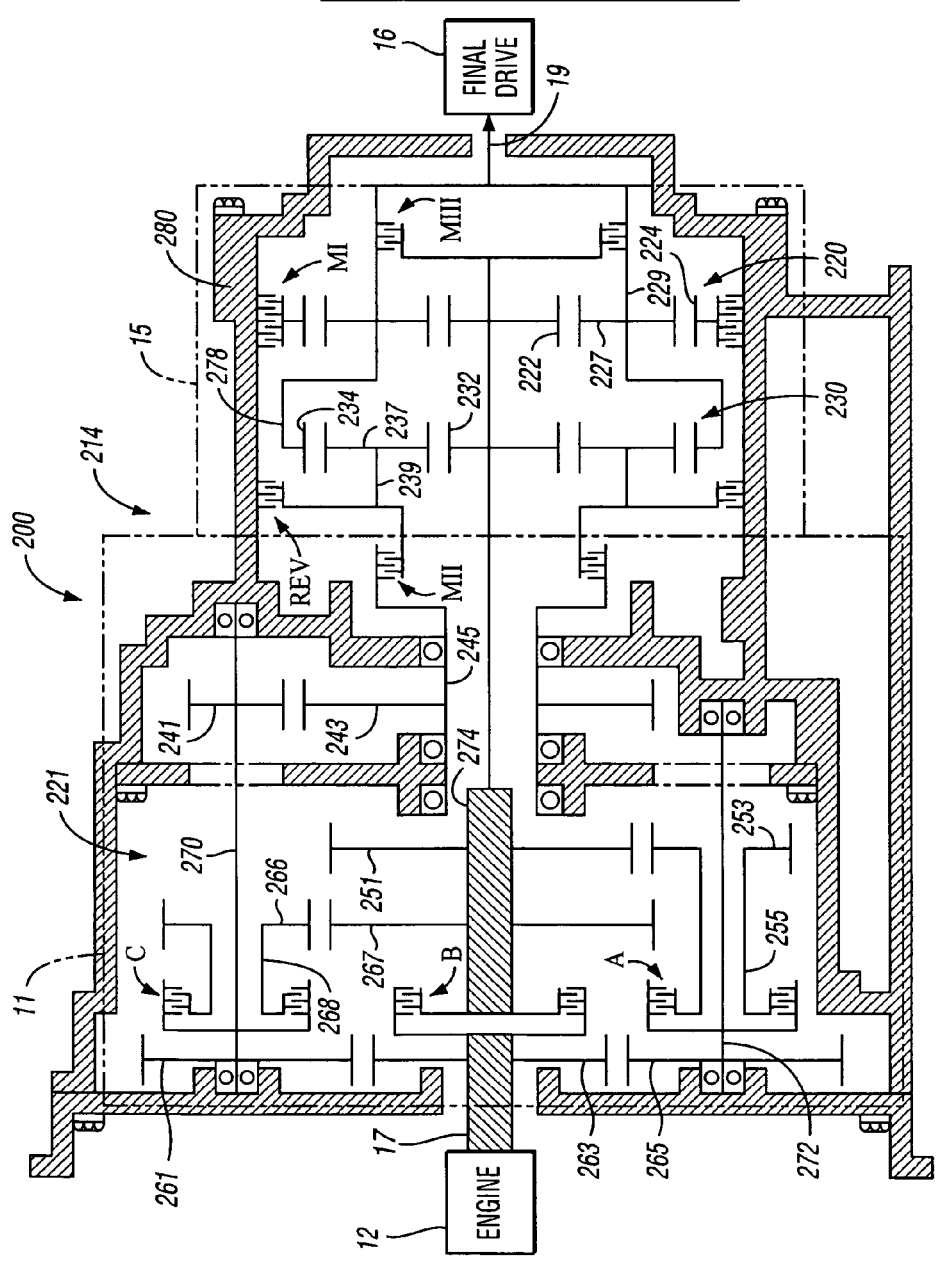
FIG. 5 is a schematic representation of a powertrain having a second embodiment of the transmission of the present invention.
FIG. 6 is a chart depicting some of the operating characteristics of the powertrain shown in FIG. 5.

Referring to FIG. 5, another embodiment of a powertrain 200 having an engine 12, a planetary transmission 214 and a final drive mechanism 16 is depicted. A torque converter 13 with lock-up clutch 18 of FIG. 2 may also be employed between the engine 12 and the input shaft 17.

The planetary transmission 214 includes the input shaft 17 continuously connected with engine 12 and an output shaft 19 continuously connected with the final drive mechanism 16. The transmission 214 includes a first planetary gear set 220 and a second planetary gear set 230. The planetary gear sets 220 and 230 are within and partially define a rear section 15 of the transmission 214. A front section 11 of the transmission 214 includes a plurality of gears 221, as described below.

The planetary gear set 220 includes a sun gear member 222, a ring gear member 224, and a carrier member 229. A plurality of pinion gears 227 are rotatably supported on the carrier member 229 and disposed in meshing relationship with both the sun gear member 222 and the ring gear member 224. The planetary gear set 220 is referred to in the claims as the first planetary gear set.

The planetary gear set 230 includes a sun gear member 232, a ring gear member 234, and a carrier member 239. A plurality of pinion gears 237 are rotatably supported on the carrier member 239 and disposed in meshing relationship with both the sun gear member 232 and the ring gear member 234. The planetary gear set 230 is referred to in the claims as the second planetary gear set.

The plurality of gear members 221 includes a headset comprised of gear 261, gear 263 and gear 265. Gear 263 is connected for common rotation with the input shaft 17. Gear 261 intermeshes with gear 263 and is connected for common rotation with a countershaft 270. Gear 265 intermeshes with gear 263 and is connected for common rotation with a countershaft 272. Gear 263 is referred to in the claims as the first gear member of the plurality of gear members 221. The plurality of gear members 221 further includes gear 266 which rotates about countershaft 270 on sleeve shaft 268. Gear 266 intermeshes with gear 267 which is connected for common rotation with interconnecting member or shaft 274. Connecting shaft 274 may be one component or separate components and also interconnects with sun gear members 222 and 232. The plurality of gear members 221 also includes gear 251 which is connected for common rotation with connecting shaft 274. The plurality of gear members 221 further includes gear 253 which is connected for common rotation with sleeve shaft 255 and rotates about countershaft 272. Furthermore, the plurality of gear members 221 includes gears 241 and 243. Gear 241 is connected for common rotation with the countershaft 270 and intermeshes with gear 243 which is connected for common rotation with sleeve shaft 245. Sleeve shaft 245 rotates about and is concentric with the connecting shaft 274.

The input shaft 17 is continuously connected with the gear 263. The output shaft 19 is continuously connected with the carrier member 229. The interconnecting member 278 continuously connects the ring gear member 234 with the carrier member 229. The connecting shaft 274 continuously connects the sun gear members 222 and 232. Gear 261 is continuously connected with gear 241 via the countershaft 270. Gear 267 is continuously connected with gear 251 via the connecting shaft 274. Gear 266 is intermeshed with gear 267, gear 241 is intermeshed with gear 243, and gear 253 is intermeshed with gear 251.

Gear 265 is selectively connectable with gear 253 by the engagement of the clutch A which interconnects the countershaft 272 with the sleeve shaft 255. The input member 17 is selectively connectable with the connecting shaft 274 via engagement of the clutch B. Gear 261 is selectively connectable with gear 266 via engagement of clutch C which interconnects the countershaft 270 with the sleeve shaft 268. Ring gear member 224 is selectively connectable with the transmission housing 280 via engagement of the brake MI. Gear 243 is selectively connectable with the carrier member 239 via engagement of the clutch MII. The sun gear member 222 is selectively connectable with carrier member 229 via engagement of the clutch MIII which also interconnects the sun gear member 222 with the output member 19. The carrier member 239 is selectively connectable with the transmission housing 280 via engagement of the brake REV.

As shown in the chart of FIG. 6, the torque-transmitting mechanisms of FIG. 5 (i.e., clutches A, B, C, clutch MII, clutch MIII and brakes MI and REV) are selectively engaged in combinations of two to provide nine forward speed ratios and three reverse speed ratios (corresponding torque ratios are listed). The engagement schedule for torque-transmitting mechanisms of FIG. 5 is shown in the chart of FIG. 6. FIG. 6 also provides an example of torque ratios that are available using the follow gear tooth counts and ring gear/sun gear tooth ratios in FIG. 5: gears 261, 263 and 265 each have 100 teeth, gear 266 has 112 teeth, gear 267 has 88 teeth, gear 251 has 113 teeth, gear 253 has 87 teeth, gear 241 has 74 teeth, gear 243 has 126 teeth; the planetary gear set 220 has a ring gear/sun gear tooth ratio of 3.96, and the planetary gear set 230 has a ring gear/sun gear tooth ratio of 4.84.

The first three forward speed ratios of FIG. 5 are first modal speed ratios (because the brake MI is engaged with the input torque-transmitting mechanisms A, B and C) establishing a first mode. The fourth forward speed ratio is a first transition speed ratio (corresponding with the torque ratio of 2.86). The fifth forward speed ratio is a second modal speed ratio (because the clutch MII is engaged with clutch C) establishing a second mode. The sixth forward speed ratio is a second transition speed ratio (corresponding with the torque ratio of 1.70). The seventh, eighth and ninth forward speed ratios are third modal speed ratios (because the clutch MIII is engaged with the input torque-transmitting mechanisms A, B and C) establishing a third mode. The first through seventh forward speed ratios are underdrive ratios, the eighth forward speed ratio is a direct drive ratio and the ninth forward speed is an overdrive speed ratio, as determined by the gear ratio selections of each component. Each of the forward speed ratios as well as the three reverse speed ratios involve single transition shifts, are characterized by close ratio steps (listed in FIG. 6) and the first forward speed ratio as well as the first reverse speed ratio (R1) are deep start ratios.

The transmission 214 of FIG. 5 provides a locked output feature by engaging both the brake REV and the brake MI simultaneously while on an incline. As the output shaft 19 attempts to rotate in one direction (for instance, clockwise) the carrier member 229 as well as the ring gear member 234 will also attempt to rotate clockwise. This will force the sun gear member 222 to attempt to rotate clockwise while the sun gear member 232 attempts to rotate counter-clockwise, thus effectively preventing rotation of the output shaft 19.

With respect to the claims, the gear 263 is the first gear member of the plurality of gear members, gear 251 is the second gear member of the plurality of gear members and gear 243 is the third gear member of the plurality of gear members. Accordingly, the speed of the sun gear member 232 increases during the first mode, decreases during the second mode and increases again during the third mode. The connecting shaft 274 is comparable to power flow path D, and the sleeve shaft 245 and gear 243 is comparable to power flow path E.

As shown and described above for the transmission of FIG. 2, those skilled in the art will understand from the chart of FIG. 6 how the torque ratios shown are established through the planetary gear sets 220 and 230 as well as the plurality of gear members 221.

Third Transmission Embodiment

Figures 7, 8:
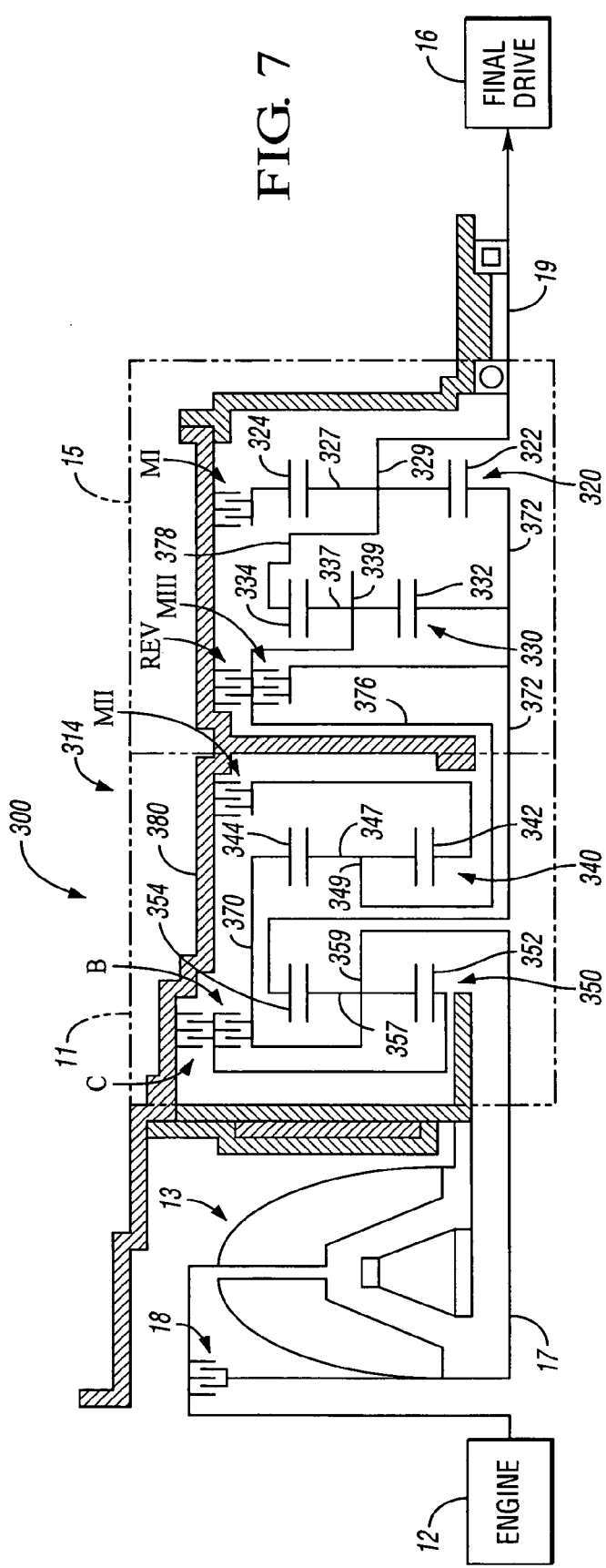
FIG. 7 is a schematic representation of a powertrain having a third embodiment of the transmission of the present invention.
FIG. 8 is a chart depicting some of the operating characteristics of the powertrain shown in FIG. 7.

FIG. 7 shown a powertrain 300 having an engine 12, a transmission 314 and a final drive mechanism 16. The transmission 314 may be characterized by a front section 11 and a rear section 15.

The transmission 314 includes an input shaft 17 continuously connected with the engine 12 either through a torque converter 13 or via engagement of a torque converter lock-up clutch 18 which effectively bypasses the torque converter 13. The transmission 314 also includes an output shaft 19 continuously connected with the final drive mechanism 16. The transmission 314 includes four planetary gear sets 320, 330, 340 and 350. The planetary gear sets 340 and 350 partially define the front section 11 and the planetary gear sets 320 and 330 partially define the rear section 15. Planetary gear set 320 is referred to in the claims as the first planetary gear set, and the planetary gear set 330 is referred to in the claims as the second planetary gear set. The planetary gear sets 340 and 350 are referred to in the claims as a plurality of gear members.

Planetary gear set 320 includes a sun gear member 322, a ring gear member 324 and carrier member 329. A plurality of pinion gears 327 are rotatably supported on the carrier member 329 and disposed in meshing relationship with both the sun gear member 322 and the ring gear member 324.

Planetary gear set 330 includes a sun gear member 332, a ring gear member 334 and a carrier member 339. A plurality of pinion gear 337 are rotatably supported on the carrier member 339 and disposed in meshing relationship with both the sun gear member 332 and the ring gear member 334.

Planetary gear set 340 includes a sun gear member 342, a ring gear member 344 and a carrier member 349. A plurality of pinion gears 347 are rotatably supported on the carrier member 349 and disposed in meshing relationship with both the sun gear member 342 and the ring gear member 344.

The planetary gear set 350 includes a sun gear member 352, a ring gear member 354 and a carrier member 359. A plurality of pinion gears 357 are rotatably supported on the carrier member 359 and disposed in meshing relationship with both the sun gear member 352 and the ring gear member 354.

The input shaft 17 is continuously connected with the carrier member 359 and therefore also to the ring gear member 344 via interconnecting member 370 which connects the carrier member 359 with the ring gear member 344. The output shaft 19 is continuously connected with the carrier member 329 and therefore also with the ring gear member 334 which is continuously connected with the carrier member 329 via interconnecting member 378. The ring gear member 354 is continuously connected with the sun gear member 332 and also with the sun gear member 322 via an interconnecting member 372 which may be one component or separate components. The carrier member 349 is continuously connected with the carrier member 339 via interconnecting member 376. The planetary gear sets 340 and 350 are referred to as a plurality of gear members within the claims.

With respect to the claims, the first gear member of the plurality of gear members is carrier member 359, the second gear member of the plurality of gear members is ring gear member 354, and the third gear member of the plurality of gear members is carrier member 349.

The sun gear member 352 is selectively connectable with the carrier member 359 and the ring gear member 344 via engagement of the clutch B. The sun gear member 352 is selectively connectable to transmission housing 380 via engagement of the brake C. The clutch B and brake C are referred to herein as input torque-transmitting mechanisms. The ring gear member 324 is selectively connectable with the transmission housing 380 via engagement of the first modal torque-transmitting mechanism, brake MI. The sun gear member 342 is selectively connectable with the transmission housing 380 via engagement of the second modal torque-transmitting mechanism, brake MII. The carrier member 339 is selectively connectable with the sun gear member 332 (and also the sun gear member 322 and ring gear member 354 via the interconnecting member 372) via engagement of the third modal torque-transmitting mechanism, clutch MII. The carrier member 339 (and also the carrier member 349 via the interconnecting member 376) is selectively connectable with the transmission housing 380 via engagement of the brake REV.

Referring to the chart of FIG. 8, the engagement schedule for the torque-transmitting mechanisms of the transmission 314 of FIG. 7 to achieve seven forward speed ratios and two reverse speed ratios is provided. Torque ratios as well as ratio steps associated with the speed ratios are listed. A corresponding numerical speed ratio is associated with each of numbers 1-7, R2 and R1. The first and second forward speed ratios are first modal speed ratios (because brake MI is engaged with the input torque-transmitting mechanisms B and C) and establish a first mode. The third forward speed ratio establishes a first transition speed ratio. The fourth forward speed ratio is a second modal speed ratio (because brake MII is engaged with brake C) and establishes a second mode. The fifth forward speed ratio establishes a second transition mode. The sixth and seventh forward speed ratios are third modal speed ratios (because brake MIII is engage with the input torque-transmitting mechanisms B and C) and establish a third mode. The engagement schedule depicted in FIG. 8 involves single transition shifts. Additionally, the first forward speed ratio as well as the reverse ratio R1 provides a deep start ratio. The transmission 314 is designed to provide the close ratio steps listed in FIG. 8. The listed torque ratios and ratio steps result from the following ring gear/sun gear tooth ratios of the transmission 314 of FIG. 7: the ring gear/sun gear tooth ratio of planetary gear set 320 is 3.00; the ring gear/sun gear tooth ratio of the planetary gear set 330 is 3.80; the ring gear/sun gear tooth ratio of the planetary gear set 340 is 2.88; and the ring gear/sun gear tooth ratio of the planetary gear set 350 is 2.88.

Application of the brake REV and the brake MI provides a lockout feature to prevent rotation of the output member 19 on steep grades. The lockout feature performs in the same manner as that described with respect to the lockout feature of FIG. 2.

Fourth Transmission Embodiment

Figure 9:
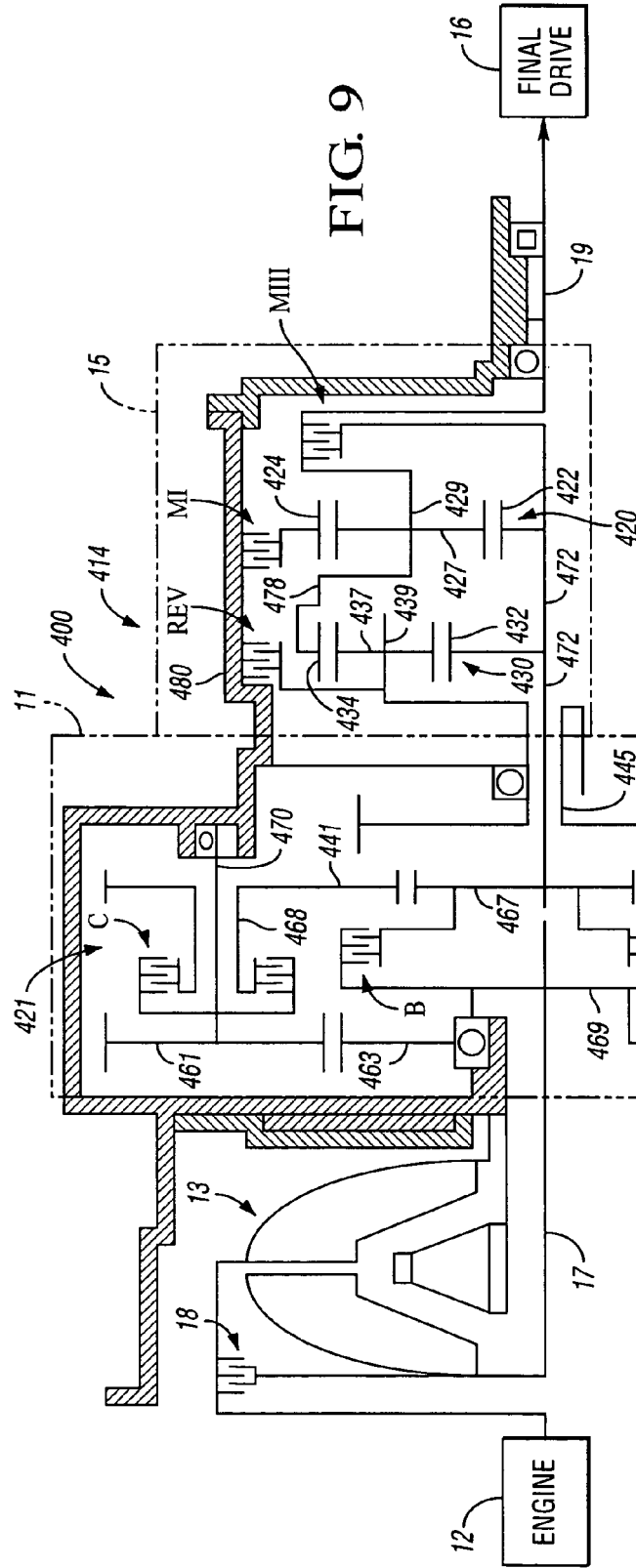
FIG. 9 is a schematic representation of a powertrain having a fourth embodiment of the transmission of the present invention.

Referring to FIG. 9, another embodiment of a powertrain 400 having engine 12, a planetary transmission 414 and a final drive mechanism 16 is depicted. The transmission 414 may be characterized by a front section 11 and a rear section 15.

The transmission 414 includes an input shaft 17 continuously connected with the engine 12 either through a torque converter 13 or via engagement of a torque converter lockup clutch 18 which effectively bypasses the torque converter 13. The transmission 414 also includes an output shaft 19 continuously connected with the final drive mechanism 16. The transmission 414 includes a first planetary gear set 420 and a second planetary gear set 430. The planetary gear sets 420 and 430 are within and partially define the rear section 15 of the transmission 414. The front section 11 of the transmission 414 includes a plurality of gear members 421, as described below.

The planetary gear set 420 includes a sun gear member 422, a ring gear member 424, and a carrier member 429. A plurality of pinion gears 427 are rotatably supported on the carrier member 429 and disposed in meshing relationship with both the sun gear member 422 and the ring gear member 424.

The planetary gear set 430 includes a sun gear member 432, a ring gear member 434, and a carrier member 439. A plurality of pinion gears 437 are rotatably supported on the carrier member 439 and disposed in meshing relationship with both the sun gear member 432 and the ring gear member 434.

The plurality of gear members 421 includes a head set comprised of gear 461, gear 463 and gear 465. Gear 463 has a hub portion 469 and is connected for common rotation with the input shaft 17. Gear 461 intermeshes with gear 463 and is connected for common rotation with the countershaft 470. Gear 465 intermeshes with gear 463 and is connected for common rotation with the countershaft 471. Gear 463 is referred to in the claims as the first gear of the plurality of gear members 421. The plurality of gear members 421 further includes gear 441 which rotates about countershaft 470 on sleeve shaft 468. Gear 441 intermeshes with gear 467 which is connected for common rotation with connecting member or shaft 472. Connecting shaft 472 may be one component or separate components and also interconnects the sun gear members 422 and 432. The plurality of gear members 421 further include gear 453 which is connected for common rotation with the sleeve shaft 455 and rotates about countershaft 471. Furthermore, the plurality of gear members 421 includes gear 443, intermeshed with gear 453 and is connected for common rotation with sleeve shaft 445 and carrier 439. Sleeve shaft 445 rotates about in a concentric with the connecting shaft 471.

The input shaft 17 is continuously connected with gear 463. The output shaft 19 is continuously connected with the carrier member 429. The interconnecting member 478 continuously connects the ring gear member 434 with the carrier member 429. The connecting shaft or interconnecting member 472 continuously connects the sun gear members 422 and 432. Gear 467 is continuously connected with the sun gear members 422 and 432 via the interconnecting member or connecting shaft 472.

The input member 17 is selectively connectable with gear 467, and therefore with the connecting shaft 472, via engagement of the clutch B which also connects gear 463 (via its hub portion 469) to gear 467. Gear 461 is selectively connectable with gear 441 via engagement of clutch C which interconnects the countershaft 470 with the sleeve shaft 468. Ring gear member 424 is selectively connectable with the transmission housing 480 via engagement of the brake MI. Gear 465 is selectively connectable with gear 453 via engagement of clutch MII which interconnects countershaft 471 with the sleeve shaft 455. The carrier member 429 is selectively connectable with sun gear member 422 via engagement of the clutch MIII, which also interconnects with sun gear member 422 with the output member 19. The carrier member 429 is selectively connectable with the transmission housing 480 via engagement of the brake REV.

Figure 10:
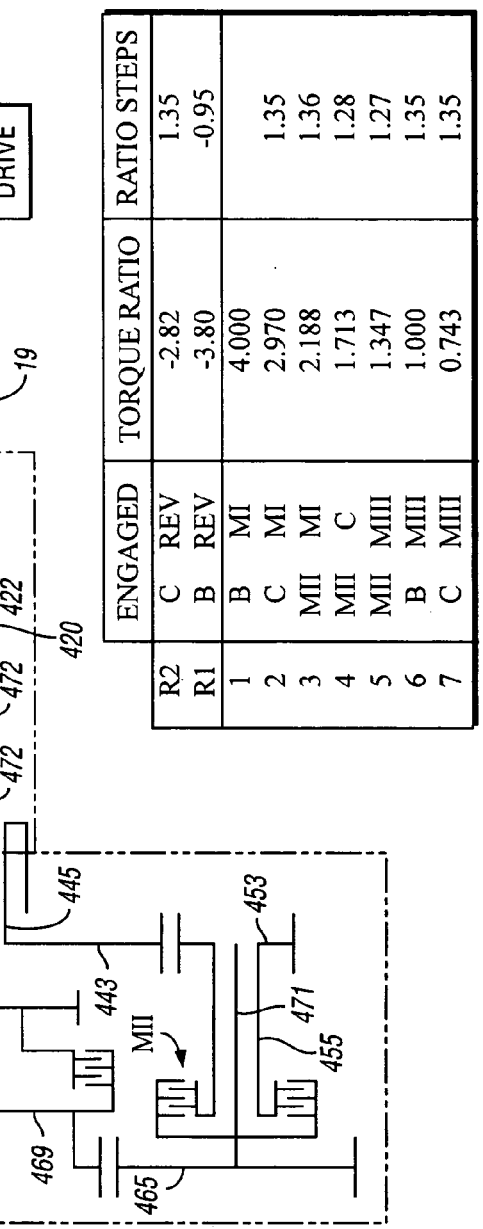
FIG. 10 is a chart depicting some of the operating characteristics of the powertrain shown in FIG. 9.

As shown in the chart of FIG. 10, the torque-transmitting mechanisms of FIG. 9 (i.e., clutches B and C, clutch MII, clutch MIII and brakes MI and REV) are selectively engaged in combinations of two to provide seven forward speed ratios and two reverse speed ratios. The engagement schedule for the torque-transmitting mechanisms of FIG. 9 is shown in the chart of FIG. 10. FIG. 10 also provides an example of the torque ratios that are available using the following gear tooth counts and ring gear/sun gear tooth ratio in FIG. 9: gear 441 has 101 teeth, gear 467 has 75 teeth, gear 443 has 101 teeth, gear 453 has 75 teeth; planetary gear set 420 has a ring gear/sun gear tooth ratio of 3.00 and the planetary gear set 430 has a ring gear/sun gear tooth ratio of 3.80. The headset (gears 461 to 463 and 465 to 463) has a 1.0 ratio.

The first two forward speed ratios (corresponding with the first two listed forward torque ratios of FIG. 10) are first modal speed ratios (because the brake MI is engaged with the input torque-transmitting mechanisms B and C) establishing a first mode. The third forward speed ratio is a first transition speed ratio, (corresponding with a torque ratio of 2.188). The fourth forward speed ratio is a second modal speed ratio (because the clutch MII is engaged with the input torque-transmitting mechanism C) establishing a second mode. The fifth forward speed ratio is a second transition speed ratio (corresponding with a torque ratio of 1.347). The sixth and seventh forward speed ratios are third modal speed ratios (because the clutch MIII is engaged with the input torque-transmitting mechanisms B and C) establishing a third mode. The first through fifth forward speed ratios are underdrive ratios, the sixth forward speed ratio is a direct drive ratio and the seventh forward speed ratio is an overdrive ratio. Each of the forward speed ratios as well as the two reverse speed ratios involve singe transition shifts, are characterized by close ratio steps (listed in FIG. 10) and the first forward speed ratio as well as the first reverse speed ratio (corresponding with the torque ratio listed for R1) are deep start ratios.

The transmission 414 of FIG. 9 provides a lockout feature by engaging both the brake REV and the brake MI while on an incline. The lockout feature functions as described with respect to the transmission 214 of FIG. 5.

With respect to the claims, gear 463 is the first gear member, gear 468 is the second gear member, and gear 443 is the third gear member. Accordingly, the speed of the sun gear member 432 increases during the first mode, decreases during the second mode and increases again during the third mode. The connecting shaft or interconnecting member 472 is comparable to power flow path D, and the sleeve shaft 445 and gear 443 are comparable to power flow path E.

As shown and described above for the transmission of FIG. 2, those skilled in the art will understand from the chart from FIG. 10 how the torque ratios shown are established through the planetary gear sets 420 and 430 as well as the plurality of gear members 421.

Fifth Transmission Embodiment

Figures 11, 12:
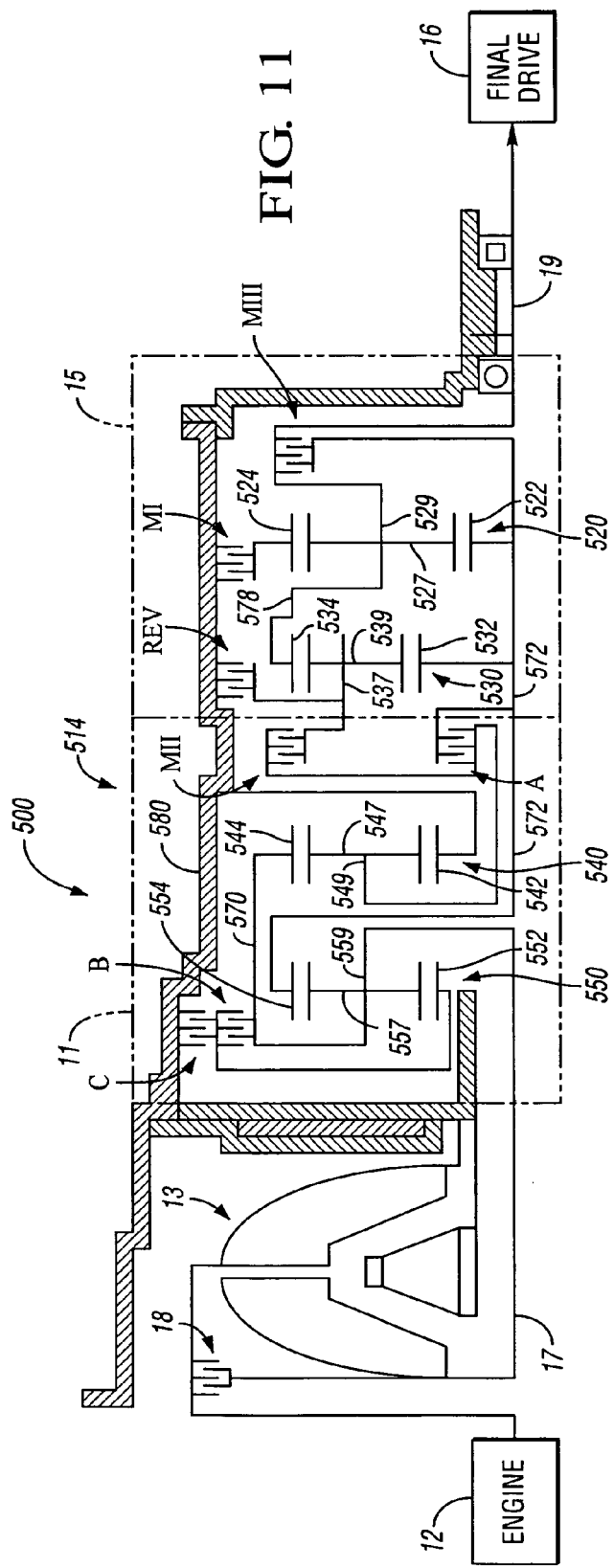
FIG. 11 is a schematic representation of a powertrain incorporating a fifth embodiment of the transmission of the present invention.
FIG. 12 is chart depicting some of the operating characteristics of the powertrain shown in FIG. 11.

FIG. 11 shows a powertrain 500 having an engine 12, a transmission 514, and a final drive mechanism 16. The transmission 514 may be characterized by a front section 11 and a rear section 15. Transmission 514 includes an input shaft 17 continuously connected with the engine 12 via a torque converter 13 or via engagement of the torque converter lockup clutch 18 which effectively bypasses the torque converter 13. The transmission 514 also includes an output shaft 19 continuously connected with the final drive mechanism 16. Transmission 514 includes four planetary gear sets, 520, 530, 540 and 550. The planetary gear sets 540 and 550 partially define the front section 11 and the planetary gear sets 520 and 530 partially define the rear section 15. Planetary gear set 520 is referred to in the claims as the first planetary gear set, and the planetary gear set 530 is referred to in the claims as the second planetary gear set. The planetary gear sets 540 and 550 are referred to in the claims as a plurality of gear members.

Planetary gear set 520 includes a sun gear member 522, a ring gear member 524 and carrier member 529. A plurality of pinion gears 527 are rotatably supported on the carrier member 529 and disposed in meshing relationship with both the sun gear member 522 and the ring gear member 524.

Planetary gear set 530 includes a sun gear member 532, a ring gear member 534 and a carrier member 539. A plurality of pinion gear 537 are rotatably supported on the carrier member 539 and disposed in meshing relationship with both the sun gear member 532 and the ring gear member 534.

Planetary gear set 540 includes a sun gear member 542, a ring gear member 544 and a carrier member 549. A plurality of pinion gears 547 are rotatably supported on the carrier member 549 and disposed in meshing relationship with both the sun gear member 542 and the ring gear member 544.

The planetary gear set 550 includes a sun gear member 552, a ring gear member 554 and a carrier member 559. A plurality of pinion gears 557 are rotatably supported on the carrier member 559 and disposed in meshing relationship with both the sun gear member 552 and the ring gear member 554.

The input shaft 17 is continuously connected with the carrier member 559 and therefore also to the ring gear member 544 via interconnecting member 570 which connects the carrier member 559 with the ring gear member 544. The output shaft 19 is continuously connected with the carrier member 529 and therefore also with the ring gear member 534 which is continuously connected with the carrier member 529 via interconnecting member 578. The ring gear member 554 is continuously connected with the sun gear member 532 and the sun gear member 522 via an interconnecting member 572 which may be one component or several components. The planetary gear sets 540 and 550 are referred to as a plurality of gear members within the claims. With respect to the claims, the first gear member of the plurality of gear members is carrier member 559, the second gear member of the plurality of gear members is ring gear member 554, and the third gear member of the plurality of gear members is carrier member 549.

The ring gear member 554 is selectively connectable with the carrier member 549 via engagement of the clutch A. The sun gear member 552 is selectively connectable with the carrier member 559, and also with the ring gear member 554 via the interconnecting member 579, via engagement of the clutch B. The sun gear member 552 is selectively connectable with the transmission housing 580 via engagement of the brake C. The clutches A and B and the brake C are referred to herein as input torque-transmitting mechanisms. The ring gear member 524 is selectively connectable to the transmission housing 580 via engagement of the first modal torque-transmitting mechanism, brake MI. The carrier member 549 is selectively connectable with carrier member 539 via engagement of the second modal torque-transmitting mechanism, clutch MII. The carrier member 529 is selectively connectable with the sun gear member 522 via engagement of the third modal torque-transmitting mechanism, clutch MIII, and thereby also with the sun gear member 532 and the ring gear member 554 via the interconnecting member 572. The carrier member 539 is selectively connectable with the transmission housing 580 via engagement of the brake REV.

Referring to the chart of FIG. 12, the engagement schedule of the torque-transmitting mechanisms of the transmission 514 of FIG. 11 to achieve eight forward speed ratios and three reverse speed ratios is provided. Torque ratios as well as ratio steps associated with the speed ratios are provided. A corresponding speed ratio is associated with each of numbers 1-8, R1, R2 and R3. The first, second and third forward speed ratios are first modal speed ratios (because brake MI is engaged with the torque-transmitting mechanisms A, B and C) and establish a first mode. The fourth forward speed ratio is a first transition speed ratio. The fifth forward speed ratio is a second modal speed ratio because clutch MII is engaged with brake C and establishes a second mode. The sixth forward speed ratio is a second transition speed ratio. The seventh and eighth forward speed ratios are third modal speed ratios because clutch MIII is engaged with the input torque-transmitting mechanisms B and C to establish a third mode. The engagement schedule as pictured in FIG. 12 involves single transition shifts. Additionally, the first forward speed ratio as well as the reverse ratio R1 provides a deep start ratio. The transmission 514 is designed to provide the close ratio steps listed in FIG. 12. The listed torque ratios and ratio steps result from the following ring gear/sun gear tooth ratios of the transmission 514 of FIG. 11: the ring gear/sun gear tooth ratio of the planetary gear set 520 is 3.0; the ring gear/sun gear tooth ratio of the planetary gear set 530 is 3.8; the ring gear/sun gear tooth ratio of the planetary gear set 540 is 2.88; and the ring gear/sun gear tooth ratio of the planetary gear set 550 is 2.88. Application of the brake REV and the brake MI provides a lockout feature to prevent rotation of the output member 19 on steep grades. The lockout feature performs in the same manner as that described with respect to lockout feature of FIG. 2.

Sixth Transmission Embodiment

Referring to FIG. 13, another embodiment of a powertrain 600 having an engine 12, a planetary transmission 614 and a final drive mechanism 16 is depicted. The transmission 614 includes an input shaft 17 continuously connected with the engine 12 either through a torque converter 13 or via engagement of a torque converter lockup clutch 18 with effectively bypasses the torque converter 13. The transmission 614 further includes an output shaft 19 continuously connected with the final drive mechanism 16. The transmission 614 includes a first planetary gear set 620 and a second planetary gear set 630. The planetary gear sets 620 and 630 are within and partially define a rear section 15 of the transmission 614. A front section 11 of the transmission 614 includes a plurality of gear members 621 as described below.

The planetary gear set 620 includes a sun gear member 622, a ring gear member 624 and a carrier member 629. A plurality of pinion gears 627 are rotatably supported on the carrier member 629 and are disposed in meshing relationship with both the sun gear member 622 and the ring gear member 624. The planetary gear set 620 is referred to in the claims as the first planetary gear set.

The planetary gear set 630 includes a sun gear member 632, a ring gear member 634 and a carrier member 639. A plurality of pinion gears 637 are rotatably supported on the carrier member 639 and are disposed in meshing relationship with both the sun gear member 632 and the ring gear member 634. The planetary gear set 630 is referred to in the claims as the second planetary gear set.

The plurality of gear members 621 includes a head set comprised of gear 661, gear 663 and gear 665. The gear 663 has a hub portion 669 and is connected for common rotation with the input shaft 17. Gear 661 intermeshes with gear 663 and is connected for common rotation with the countershaft 671. Gear 665 intermeshes with gear 663 and is connected for common rotation with the countershaft 671. Gear 663 is referred to in the claims as the first gear member of the plurality of gear members 621. The plurality of gear members 621 further includes gear 641 which rotates about countershaft 670 on sleeve shaft 668. Gear 641 intermeshes with gear 667 which is connected for common rotation with interconnecting member or shaft 672. Connecting shaft 672 may be one component or separate components and also interconnects the sun gear members 622 and 632. The plurality of gear members 621 also includes gear 653 which is connected for common rotation with countershaft 671. Gear 653 intermeshes with gear 643. The plurality of gear members 621 further includes 643 which intermeshes with gear 653 and is connected for common rotation with sleeve shaft 645. Sleeve shaft 645 and gear 643 rotate about countershaft 672.

The input shaft 17 is continuously connected with gear 663. The output shaft 19 is continuously connected with the carrier member 629. The interconnecting member 678 continuously connects the ring gear member 634 with the carrier member 629. The interconnecting member or connecting shaft 672 continuously connects the sun gear members 622 and 632 as well as the gear 667. Gear 665 is connected for common rotation with gear 653 via the countershaft 671.

Gear 643 is selectively connectable with the sun gear members 622 and 632 via engagement of the clutch A which interconnects the interconnecting member or connecting shaft 672 with the sleeve shaft 645. The input member 17 and gear 663 are selectively connectable with gear 667 via engagement of the clutch B which also connects gear 663 (via its hub portion 669) to gear 667. Gear 661 is selectively connectable with gear 641 via engagement of clutch C which interconnects the countershaft 670 with the sleeve shaft 668. The ring gear member 624 is selectively connectable with the transmission housing 680 via engagement of the brake MI. Gear 643 is selectively connectable with carrier member 639 via engagement of the clutch MII. The carrier member 629 is selectively connectable with the sun gear member 622 and thereby also with the sun gear member 632 and the gear 667, via engagement of the clutch MIII. The carrier member 639 is selectively connectable with the transmission housing 680 via engagement of the brake REV.

As shown in the chart of FIG. 14, the torque-transmitting mechanisms of FIG. 13 (i.e., clutches A, B, C, clutches MII and MIII and brakes MI and REV) are selectively engagable in combinations of two to provide eight forward speed ratios and three reverse speed ratios (corresponding with the listed torque ratios). The engagement schedule for torque-transmitting mechanisms of FIG. 13 is shown in the chart of FIG. 14. FIG. 14 also provides an example of torque ratios using the following gear tooth counts and ring gear/sun gear tooth ratios FIG. 14: gear 653 has 75 teeth, gear 643 has 101 teeth, gear 667 has 75 teeth and gear 641 has 101 teeth; the planetary gear set 620 has a ring gear/sun gear tooth ratio of 3.0 and the planetary gear set 630 has a ring gear/sun gear tooth ratio of 3.8. The headset (gears 661, 663 and 665) has a 1.0 ratio.

The first three forward speed ratios (corresponding with the first three forward torque ratios of FIG. 14) are first modal speed ratios (because brake MI is engaged with the input torque-transmitting mechanisms A, B and C, in that order) establishing a first mode. The fourth forward speed ratio is the first transition speed ratio (corresponding with the torque ratio of 2.188). The fifth forward speed ratio is a second modal speed ratios (because the clutch MII is engaged with the clutch C) establishing a second mode. The sixth forward speed ratio is a second transition speed ratio (corresponding with a torque ratio 1.347). The seventh and eighth forward speed ratios are third modal speed ratios (because the clutch MIII is engaged with the input torque-transmitting mechanisms B and C, in that order) establishing a third mode. The first through sixth forward speed ratios are underdrive speed ratios, the seventh forward speed ratio is a direct drive ratio and the eighth forward speed ratio is an overdrive speed ratio. Each of the forward speed ratios as well as the three reverse speed ratios involve single transition shifts, are characterized by close ratio steps (listed in FIG. 14) and the first forward speed ratio as well the first reverse speed ratio (corresponding with the torque ratio listed at R1) are deep start ratios. The transmission 614 of FIG. 13 provides a lockout feature by engaging both brake REV and brake MI while on an incline. The lockout feature (i.e., prevention of rotation of output shaft 19 by application of the brakes REV and MI) functions in the same manner as that described with respect to FIG. 2.

With respect to the claims, the gear 663 is the first gear member of the plurality of gear members, gear 667 is the second gear member of the plurality of gear members, and gear 643 is the third gear member of the plurality of gear members. Accordingly, the speed of the sun gear member 632 increases during the first mode, decreases during the second mode, and increases again during the third mode. The interconnecting member 672 is comparable to power flow path D of FIG. 1 and sleeve shaft 645 and gear 643 are comparable to power flow path E of FIG. 1.

As shown and described above for the transmission of FIG. 2, those skilled in the art will understand from the chart of FIG. 14 how the torque ratios shown are established through the planetary gear sets 620 and 630 as well as the plurality of gear members 621.

Seventh Transmission Embodiment

Figures 15, 16:
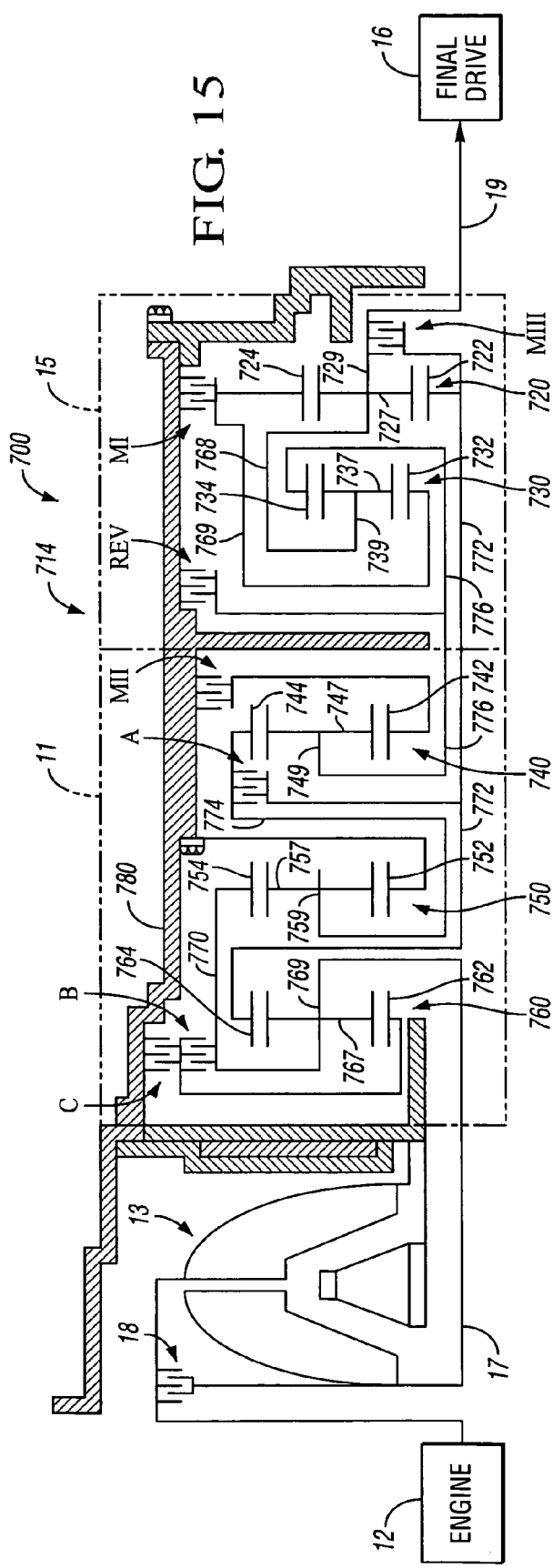
FIG. 15 is a schematic representation of a powertrain incorporating a seventh embodiment of the transmission of the present invention.
FIG. 16 is a chart depicting some of the operating characteristics of the powertrain shown in FIG. 15.

Referring to FIG. 15 shows a powertrain 700 having an engine 12, a transmission 714 and a final drive mechanism 16. The transmission 714 may be characterized by a front section 11 and a rear section 15.

The transmission 714 includes an input shaft 17 continuously connected to the engine 12 either through a torque converter 13 or via engagement of the torque converter lockup clutch 18 which effectively bypasses the torque converter 13. The transmission 714 also includes an output shaft 19 continuously connected with the final drive mechanism 16. The transmission 714 includes five planetary gear sets 720, 730, 740, 750 and 760. The planetary gear sets 740, 750 and 760 partially define the front section 11 and the planetary gear sets 720 and 730 partially define the rear section 15. Planetary gear set 720 is referred to in the claims as the first planetary gear set, and the planetary gear set 730 is referred to in the claims as the second planetary gear set. The planetary gear sets 740, 750 and 760 are referred to in the claims as a plurality of gear members.

Planetary gear set 720 includes a sun gear member 722, a ring gear member 724 and carrier member 729. A plurality of pinion gears 727 are rotatably supported on the carrier member 729 and disposed in meshing relationship with both the sun gear member 722 and the ring gear member 724.

Planetary gear set 730 includes a sun gear member 732, a ring gear member 734 and a carrier member 739. A plurality of pinion gear 737 are rotatably supported on the carrier member 739 and disposed in meshing relationship with both the sun gear member 732 and the ring gear member 734.

Planetary gear set 740 includes a sun gear member 742, a ring gear member 744 and a carrier member 749. A plurality of pinion gears 747 are rotatably supported on the carrier member 749 and disposed in meshing relationship with both the sun gear member 742 and the ring gear member 744.

The planetary gear set 750 includes a sun gear member 752, a ring gear member 754 and a carrier member 759. A plurality of pinion gears 757 are rotatably supported on the carrier member 759 and disposed in meshing relationship with both the sun gear member 752 and the ring gear member 754.

The planetary gear set 760 includes a sun gear member 762, a ring gear member 764 and a carrier member 769. A plurality of pinion gears 767 are rotatably supported on the carrier member 769 and disposed in meshing relationship with both the sun gear member 762 and the ring gear member 764.

The input shaft 17 is continuously connected with the carrier member 769 and therefore also with the ring gear member 754 via the interconnecting member 770. The output shaft 19 is continuously connected with the carrier member 729 and therefore also with the carrier member 739 via the interconnecting member 768 which interconnects carrier member 739 with carrier member 729. Ring gear member 764 is continuously connected with the sun gear member 722 via the interconnecting member 772 which may be one component or several components. The carrier member 759 is continuously connected with the ring gear member 744 via interconnecting member 774. Carrier member 749 is continuously connected with the ring gear member 734 via the interconnecting member 776 which may be one component or several components. Sun gear member 732 is continuously connected with the ring gear member 724 via the interconnecting member 769. The planetary gear sets 740, 750 and 760 are referred to as a plurality of gear members within the claims.

With respect to the claims, the first gear member of the plurality of gear members is carrier member 769, the second gear member of the plurality of gear members is ring gear member 764, and the third gear member of the plurality of gear members is carrier member 749.

The ring gear member 764 is selectively connectable with the carrier member 759 and the ring gear member 744 via the clutch A. The carrier member 769 is selectively connectable with the sun gear member 762 via engagement of the clutch B. The sun gear member 762 is selectively connectable with the transmission housing 780 via engagement of the brake C. The ring gear member 724, as well as the sun gear member 732 via the interconnecting member 769, is selectively connectable with the transmission housing 780 via engagement of the brake MI. The sun gear member 742 is selectively connectable to the transmission housing 780 via engagement of the brake MII. The sun gear member 722 is selectively connectable with the carrier member 729 and therefore with the output member 19 via engagement of the clutch MIII. The ring gear member 734 is also selectively connectable to the transmission housing 780 via the brake REV.

Referring to the chart of FIG. 16, the engagement schedule provided for the torque-transmitting mechanisms of the transmission 714 of FIG. 15 achieves nine forward speed ratios and three reverse speed ratios. Torque ratios as well as ratio steps associated with the speed ratios are listed. Speed ratios corresponding with the torque ratios are indicated by numbers 1-9, R3, R2, and R1. The first, second and third forward speed ratios are first modal speed ratios (because brake MI is engaged with the input torque-transmitting mechanisms A, B and C) establishing a first mode. The fourth forward speed ratio establishes a first transition speed ratio. The fifth forward speed ratio is the second modal speed ratio (because brake MII is engaged with clutch C) to establish a second mode. The sixth forward speed ratio is the second transition speed ratio. The seventh, eighth and ninth forward speed ratios are the third modal speed ratios (because clutch MIII is engaged with the input torque-transmitting mechanisms A, B and C) to establish a third mode. The engagement schedule depicted in FIG. 16 involves single transition shifts. Additionally, the first forward speed ratio as well as the reverse speed ratio R1 provide deep start ratios. The transmission 714 is designed to provide the close ratio steps listed in FIG. 16. Listed torque ratios and ratio steps result from the following ring gear/sun gear tooth ratios of the planetary transmission 714 of FIG. 15: the ring gear/sun gear tooth ratio of the planetary gear set 720 is 3.96; the ring gear/sun gear tooth ratio of the planetary gear set 730 is 1.52; the ring gear/sun gear tooth ratio of the planetary gear set 740 is 3.26; the ring gear/sun gear tooth ratio of the planetary gear set 750 is 3.26; and the ring gear/sun gear tooth ratio of the planetary gear set 760 is 2.88.

Application of the brake REV and the brake MI provides a lockout feature to prevent rotation of the output member 19 on steep grades. Application of brake MI and brake REV ground both the ring gear member 734 and the sun gear member 732 of the planetary gear set 730 to the transmission housing 780. This causes the entire planetary gear set 720 and planetary gear set 730 to be grounded.

Eighth Transmission Embodiment

Figures 17, 18:
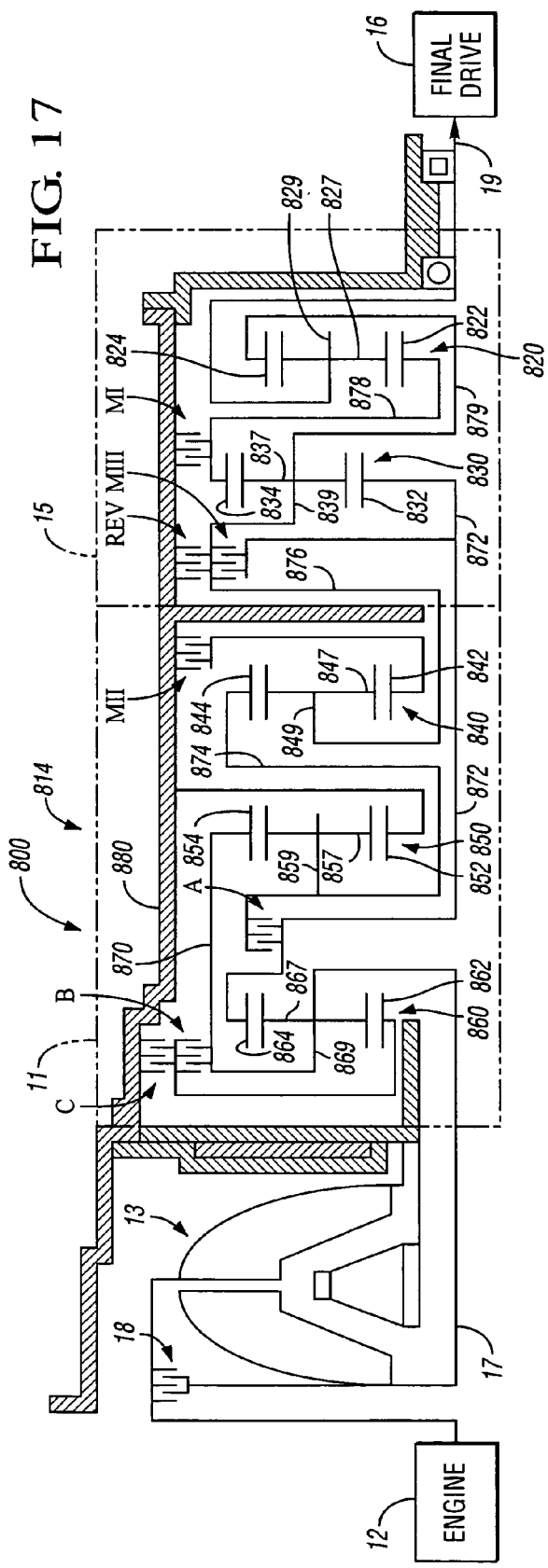
FIG. 17 is a schematic representation of a powertrain incorporating an eighth embodiment of the transmission of the present invention.
FIG. 18 is a chart depicting some of the operating characteristics of the powertrain shown in FIG. 17.

FIG. 17 shows a powertrain 800 having an engine 12, a transmission 814 and a final drive mechanism 16. The transmission 814 may be characterized by a front section 11 and a rear section 15.

The transmission 814 includes an input shaft 17 continuously connected with the engine 12 either through a torque converter 13 or via engagement of a torque converter lockup clutch 18 which effectively bypasses the torque converter 13. The transmission 814 also includes an output shaft 19 continuously connected with the final drive mechanism 16. The transmission 814 includes five planetary gear sets 820, 830, 840, 850 and 860. The planetary gear sets 840, 850 and 860 partially define the front section 11 and the planetary gear sets 820 and 830 partially define the rear section 15. The planetary gear set 820 is referred to in the claims as the first planetary gear set and the planetary gear set 830 is referred to in the claims as the second planetary gear set. The planetary gear sets 840, 850 and 860 are referred to in the claims as a plurality of gear members.

Planetary gear set 820 includes a sun gear member 822, a ring gear member 824 and carrier member 829. A plurality of pinion gears 827 are rotatably supported on the carrier member 829 and disposed in meshing relationship with both the sun gear member 822 and the ring gear member 824.

Planetary gear set 830 includes a sun gear member 832, a ring gear member 834 and a carrier member 839. A plurality of pinion gear 837 are rotatably supported on the carrier member 839 and disposed in meshing relationship with both the sun gear member 832 and the ring gear member 834.

Planetary gear set 840 includes a sun gear member 842, a ring gear member 844 and a carrier member 849. A plurality of pinion gears 847 are rotatably supported on the carrier member 849 and disposed in meshing relationship with both the sun gear member 842 and the ring gear member 844.

The planetary gear set 850 includes a sun gear member 852, a ring gear member 854 and a carrier member 859. A plurality of pinion gears 857 are rotatably supported on the carrier member 859 and disposed in meshing relationship with both the sun gear member 852 and the ring gear member 854.

The planetary gear set 860 includes a sun gear member 862, a ring gear member 864 and a carrier member 869. A plurality of pinion gears 867 are rotatably supported on the carrier member 869 and disposed in meshing relationship with both the sun gear member 862 and the ring gear member 864.

The input shaft 17 is continuously connected with the carrier member 869 (and therefore also with the ring gear member 854 via the interconnecting member 870 which connects the carrier member 869 and the ring gear member 854). The output shaft 19 is continuously connected with the carrier member 829. The ring gear member 864 is continuously connected with the sun gear member 832 via the interconnecting member 872 which may be one component or separate components. The carrier member 859 is continuously connected with the ring gear member 844 via the interconnecting member 874. The sun gear 852 is continuously connected to the housing 880. The carrier member 849 is continuously connected with the carrier member 839 via the interconnecting member 876. The ring gear member 834 is continuously connected with the sun gear member 822 via the interconnecting member 878. The carrier member 839 is continuously connected with the ring gear member 824 via the interconnecting member 879. The planetary gear sets 840, 850 and 860 are referred to as a plurality of gear members within the claims.

With respect to the claims, the first gear member of the plurality of gear members is the carrier member 869, the second gear member of the plurality of gear members is the ring gear member 864, and the third gear member of the plurality of gear members is the carrier member 849.

The ring gear member 864 is selectively connectable with the carrier member 859 via the engagement of the clutch A. The sun gear member 862 is selectively connectable with the carrier member 869 via engagement of the clutch B. The sun gear member 862 is selectively connectable with the transmission housing 880 via engagement of the brake C. The ring gear member 834 is selectively connectable with the transmission housing 880 via engagement of the brake MI. The sun gear member 842 is selectively connectable with the transmission housing 880 via engagement of the brake MII. The carrier member 849 is selectively connectable with the sun gear member 832 via engagement of the clutch MIII. The clutch MIII also connects the carrier member 839 with the sun gear member 832. The carrier member 839 is selectively connectable with the transmission housing 880 via engagement of the brake REV. This also connects the carrier member 849 and the ring gear member 824 with the transmission housing 880 via the interconnecting members 876 and 879, respectively.

Referring to the chart of FIG. 18, the engagement schedule for the torque-transmitting mechanisms of the transmission 814 of FIG. 17 to achieve nine forward speed ratios and three reverse speed ratios is provided. Torque ratios as well as ratio steps associated with the speed ratios are listed. Speed ratios corresponding with the torque ratios are indicated by the numbers 1-9, R3, R2, and R1. The first, second and third forward speed ratios are first modal speed ratios (because the brake MI is engaged with the input torque-transmitting mechanisms A, B and C) to establish a first mode. The fourth forward speed ratio is a first transition speed ratio. The fifth forward speed ratio is a second modal speed ratio because brake MII is engaged with brake C thereby establishing a second mode. The sixth forward speed ratio is a second transition speed ratio. The seven, eighth and ninth forward speed ratios are third modal speed ratios (because the clutch MIII is engaged with the input torque-transmitting mechanisms A, B and C) to establish the third mode. The engagement schedule depicted in FIG. 18 involves single transition shifts. Additionally, the first forward ratio as well as the first reverse speed ratio provide a deep start ratio. Transmission 814 is designed to provide the close ratio steps listed in FIG. 18. The listed torque ratios and ratio steps result from the following ring gear/sun gear tooth ratio of the transmission 814 of FIG. 17: the ring gear/sun gear tooth ratio of the planetary gear set 820 is 1.46; the ring gear/sun gear tooth ratio of the planetary gear set 830 is 2.06; the ring gear/sun gear tooth ratio of the planetary gear set 840 is 3.26; the ring gear/sun gear tooth ratio of the planetary gear set 850 is 3.26; and the ring gear/sun gear tooth ratio of the planetary gear set 860 is 3.26.

In the transmission 814 of FIG. 17, application of the brake REV and the brake MI provides a lockout feature to prevent rotation of the output member 19 on steep grades. Application of the brake MI prevents rotation of the ring gear member 834 and the sun gear member 822. Application of the brake REV grounds the carrier member 839, the ring gear member 834 and the carrier member 849 to the transmission housing 880. Because two members of planetary gear set 830 are held stationary, and these members interconnect with two different member of the planetary gear set 820, the entire planetary gear set 820 and the entire planetary gear set 830 are held stationary. Thus, when both the brake MI and REV are applied, the entire planetary gear sets 820 and 830 are held stationary, which prevents rotation of the output member 19.

Figure 20:
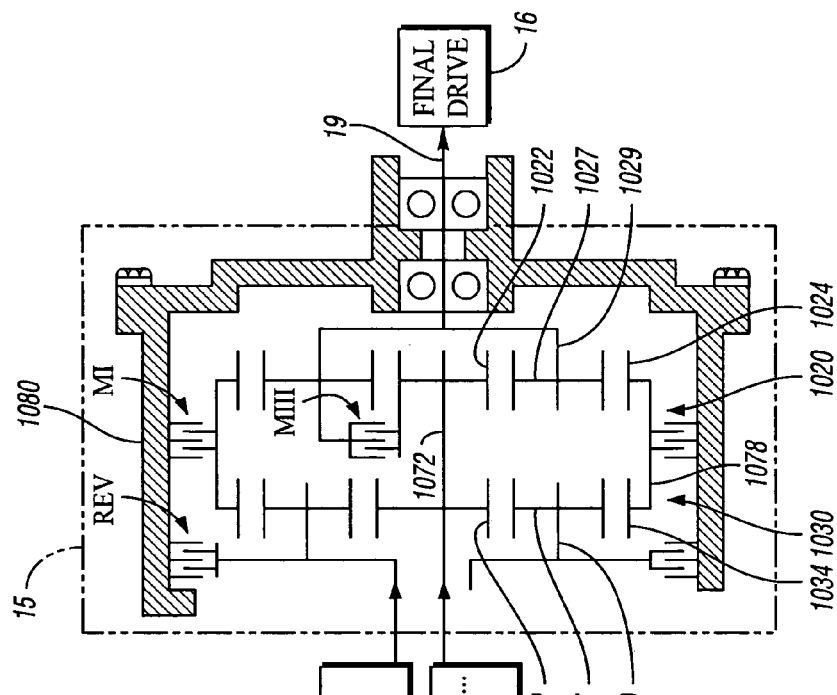
FIG. 20 is a schematic representation of two rear planetary gear sets of a transmission depicting a tenth embodiment of the present invention.
Figure 19:
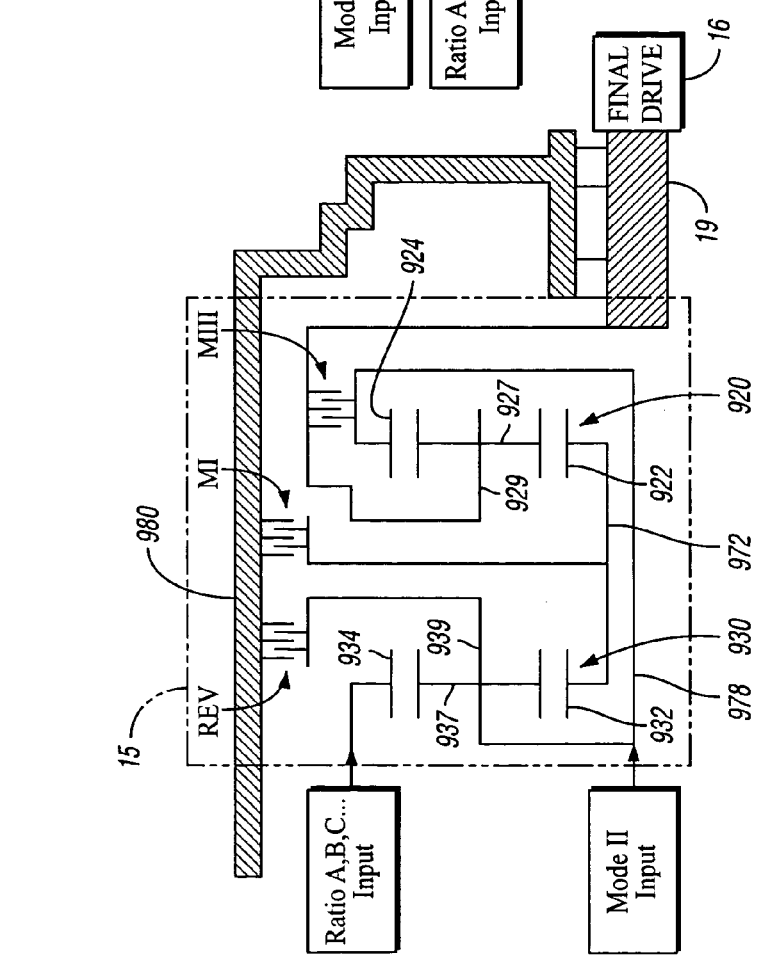
FIG. 19 is a schematic representation of two rear planetary gear sets of a ninth embodiment of the transmission of the present invention.

FIGS. 2, 5, 7, 9, 11, 13, 17 and 23 involve a similar output section 15 referred to as a first output version. FIG. 15 depicts a rear section 15 referred to as a second output version. FIG. 17 depicts a rear section 15 arranged as a third output version. FIG. 19 depicts a fourth output version, FIG. 20 depicts a fifth output version, FIG. 21 depicts a sixth output version and FIG. 22 depicts a sixth output version.

Fourth Output Section Embodiment (Ninth Transmission Embodiment)

Referring to FIG. 19, another embodiment of an output or rear section 15 of a transmission within the scope of the invention is depicted. The rear section 15 includes a first planetary gear set 920 and a second planetary gear set 930. The first planetary gear set 920 includes a sun gear member 922, ring gear member 924 and a carrier member 929 that rotatably supports a plurality of pinion gear members 927 that are disposed in meshing engagement with both the sun gear member 922 and the ring gear member 924.

The planetary gear set 930 includes a sun gear member 932, a ring gear member 934 and a carrier member 939 that rotatably supports a plurality of pinion gears 937 that are disposed in meshing relationship with both the sun gear member 932 and the ring gear member 934.

The carrier member 929 is continuously connected with the output member 19 which is continuously connected with the final drive mechanism 16. The sun gear member 932 is continuously connected with the sun gear member 922 via the interconnecting member 972. The carrier member 939 is continuously connected with the ring gear member 924 via the interconnecting member 978. Various input torque-transmitting mechanisms including clutches A, B and C in any of the input sections 11 of embodiments described herein are selectively engagable to provide power flow at the ring gear member 934. Power flow to the ring gear member 934 is along path D of FIG. 1. Similarly, a second modal torque-transmitting mechanism, clutch MII in any of the input sections 11 of the embodiments described herein is selectively engagable to provide power flow to the carrier member 939 and also to the ring gear member 924 via the interconnecting member 978. Power flow to the carrier member 939 is along path E of FIG. 1. A first modal torque-transmitting mechanism, the brake MI, is selectively engagable to connect the sun gear members 922 and 932 to the transmission housing 980. A third modal torque-transmitting mechanism, clutch MIII, is selectively engagable to connect the carrier member 929 with the ring gear member 924. A brake REV is selectively engagable to connect carrier member 939 with the transmission housing 980.

Application of both the brake MI and the brake REV provides a lockout feature to prevent the output member 19 from rotating on steep grades. By holding the sun gear member 922 stationary via application of the brake MI and by holding the ring gear member 924 stationary via application of the brake REV, the entire planetary gear set 920 is held stationary including the carrier member 929, thereby holding the output member 19 stationary as well.

Fifth Output Section Embodiment (Tenth Transmission Embodiment)

Referring to FIG. 19, another embodiment of an output or rear section 15 for a transmission within the scope of the invention is illustrated. The rear section 15 includes both a first planetary gear set 1020 and a second planetary gear set 1030. The first planetary gear set 1020 includes a sun gear member 1022, a ring gear member 1024 and a carrier member 1029 rotatably supporting a plurality of pinion gear members 1027 disposed in meshing relationship with both sun gear member 1022 and ring gear member 1024.

The planetary gear set 1030 includes sun gear member 1032, a ring gear member 1034, and a carrier member 1039 rotatably supporting a plurality of pinion gears 1037 disposed in meshing relationship with both the sun gear member 1032 and the ring gear member 1034.

The carrier member 1029 is continuously connected with the output member 19 which is continuously connected with the final drive mechanism 16. The sun gear member 1022 is continuously connected with the sun gear member 1032 via the interconnecting member 1072. The ring gear member 1024 is continuously connected with the ring gear member 1034 via an interconnecting member 1078. Input torque-transmitting mechanisms A, B and C (or at least two thereof) in any of the input sections 11 of embodiments described herein are selectively engagable to establish power flow at the sun gear member 1032 (and therefore the sun gear member 1022 via the interconnecting member 1072). Power flow to the sun gear member 1032 is along path D of FIG. 1. A second modal torque-transmitting mechanism, clutch MII in any of the input sections 11 of the embodiments described herein, is selectively engagable to establish power flow at the carrier member 1039. Power flow to the carrier member 1039 is along path E of FIG. 1. A first modal torque-transmitting mechanism, the brake MI is selectively engagable to connect the ring gear members 1024 and 1034 with a transmission housing 1080. A third modal torque-transmitting mechanism MIII is selectively engagable to connect the carrier member 1029 with the sun gear member 1022. Engagement of both the brake MI and reverse brake REV prevents rotation of the output member 19 to provide a lockout feature on steep grades. The brake MI prevents rotation of both of the ring gear members 1024 and 1034. The brake REV prevents rotation of the carrier member 1039. Because neither the ring gear member 1034 nor the carrier member 1039 rotate, the sun gear member 1032 is also held stationary. The interconnecting member 1072 thus ensures that the sun gear member 1022 is held stationary. Because both the sun gear member 1022 and the ring gear member 1024 are stationary, the carrier member 1029, and therefore the output member 19 are stationary.

Sixth Output Section Embodiment (Eleventh Transmission Embodiment)

Referring to FIG. 21, another embodiment of an output or rear section 15 for a transmission within the scope of the invention is illustrated. The rear section 15 includes both a first planetary gear set 1120 and a second planetary gear set 1130. The first planetary gear set 1120 includes a sun gear member 1122, a ring gear member 1124 and a carrier member 1129 rotatably supporting a plurality of pinion gear members 1127 disposed in meshing relationship with both sun gear member 1122 and ring gear member 1124.

The planetary gear set 1130 includes sun gear member 1132, a ring gear member 1134, and a carrier member 1139 rotatably supporting a plurality of pinion gears 1137 disposed in meshing relationship with both the sun gear member 1132 and the ring gear member 1134.

The ring gear member 1124 is continuously connected with the output member 19 which is continuously connected with the final drive mechanism 16. The carrier member 1139 is continuously connected with the carrier member 1129 via the interconnecting member 1172. The sun gear member 1122 is continuously connected with the sun gear member 1132 via an interconnecting member 1178. Input torque-transmitting mechanism B in any of the input sections 11 of embodiments discussed herein is selectively engagable to establish power flow at the carrier member 1129 (and therefore the carrier member 1139 via the interconnecting member 1172). Input torque-transmitting mechanism C in any of the input sections 11 of embodiments discussed herein is selectively engagable to establish power flow at the sun gear member 1132 (and therefore the sun gear member 1122 via the interconnecting member 1178). Power flow to the carrier member 1129 or to the sun gear member 1132 is along the path D of FIG. 1. A second modal torque-transmitting mechanism, MII in any of the input sections 11 of the embodiments discussed herein, is selectively engagable to establish power flow at the carrier member 1139. Power flow to the carrier member 1139 is along path E of FIG. 1. A first modal torque-transmitting mechanism, the brake MI is selectively engagable to connect the ring gear member 1134 with a transmission housing 1180. A third modal torque-transmitting mechanism MIII is selectively engagable to connect the carrier member 1129 with the ring gear member 1124. Engagement of both the brake MI and reverse brake REV prevents rotation of the output member 19 to provide a lockout feature on steep grades. The brake MI prevents rotation of ring gear members 1134. The brake REV prevents rotation of the carrier member 1139. Because neither the ring gear member 1134 nor the carrier member 1139 rotate, the sun gear member 1132 is also held stationary. The interconnecting members 1172 and 1178 thus ensure that the sun gear member 1122 and the carrier member 1129 are held stationary. Because both the sun gear member 1122 and the carrier member 1129 are stationary, the ring gear member 1124, and therefore the output member 19 are stationary.

Seventh Output Section Embodiment (Twelfth Transmission Embodiment)

Referring to FIG. 22, another embodiment of an output or rear section 15 for a transmission within the scope of the invention is illustrated. The rear section 15 includes both a first planetary gear set 1220 and a second planetary gear set 1230. The first planetary gear set 1220 includes a sun gear member 1222, a ring gear member 1224 and a carrier member 1229 rotatably supporting a plurality of pinion gear members 1227 disposed in meshing relationship with both sun gear member 1222 and ring gear member 1224.

The planetary gear set 1230 includes sun gear member 1232, a ring gear member 1234, and a carrier member 1239 rotatably supporting a plurality of pinion gears 1237 disposed in meshing relationship with both the sun gear member 1232 and the ring gear member 1234.

The ring gear member 1224 is continuously connected with the output member 19 which is continuously connected with the final drive mechanism 16. The ring gear member 1234 is continuously connected with the carrier member 1229 via the interconnecting member 1272. The carrier member 1239 is continuously connected with the ring gear member 1224 via an interconnecting member 1278. Input torque-transmitting mechanism B in any of the input sections 11 of embodiments described herein is selectively engagable to establish power flow at the carrier member 1229 (and therefore the ring gear member 1234 via the interconnecting member 1272). Input torque-transmitting mechanism C in any of the input sections 11 of embodiments discussed herein is selectively engagable to establish power flow at the sun gear member 1222. Power flow to the carrier member 1229 or to the sun gear member 1222 is along path D of FIG. 1. A second modal torque-transmitting mechanism, MII is in any of the input sections 11 of the embodiments described herein, is selectively engagable to establish power flow at the carrier member 1229 and therefore the ring gear member 1234 via the interconnecting member 1272. Power flow from the MII input to the carrier member 1229 is along path E of FIG. 1. A first modal torque-transmitting mechanism, the brake MI is selectively engagable to connect the sun gear member 1232 with a transmission housing 1280. A third modal torque-transmitting mechanism MIII is selectively engagable to connect the carrier member 1229 with the ring gear member 1224. Engagement of both the brake MI and reverse brake REV prevents rotation of the output member 19 to provide a lockout feature on steep grades. The brake MI prevents rotation of the sun gear member 1232. The brake REV prevents rotation of both the carrier member 1229 and the ring gear members 1234 and 1224. Therefore, the output member 19 is stationary.

Thirteenth Transmission Embodiment

Figures 23, 24:
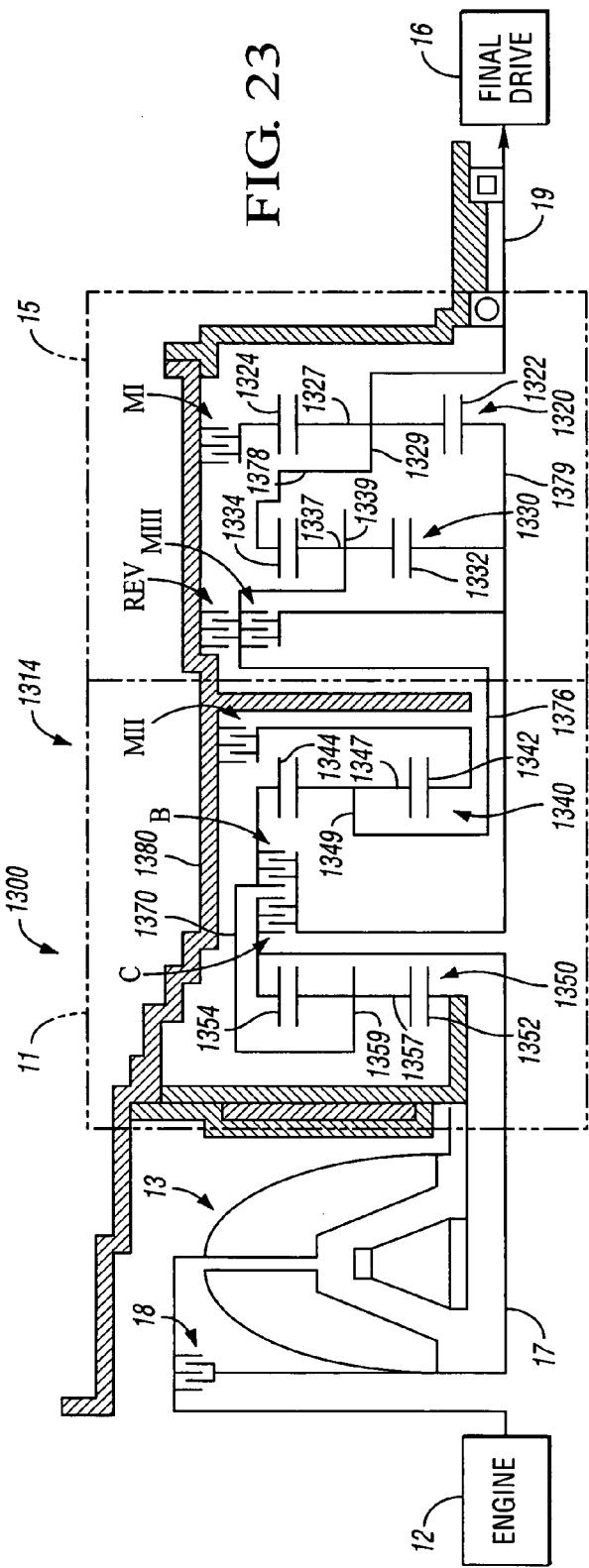
FIG. 23 is a schematic representation of a powertrain incorporating a thirteenth embodiment of the transmission of the present invention.
FIG. 24 is a chart depicting some of the operating characteristics of the powertrain shown in FIG. 23.

FIG. 23 shows a powertrain 1300 having an engine 12, a transmission 1314 and a final drive mechanism 16. The transmission 1314 may be characterized by a front section 11 and a rear section 15.

The transmission 1314 includes an input shaft 17 continuously connected with the engine 12 either through a torque converter 13 or via engagement of a torque converter lockup clutch 18 which effectively bypasses the torque converter 13. The transmission 1314 also includes an output shaft 19 continuously connected with the final drive mechanism 16. The transmission 1314 includes four planetary gear sets 1320, 1330, 1340, and 1350. The planetary gear sets 1340 and 1350 partially define the front section 11 and the planetary gear sets 1320 and 1330 partially define the rear section 15. The planetary gear set 1320 is referred to in the claims as the first planetary gear set and the planetary gear set 1330 is referred to in the claims as the second planetary gear set. The planetary gear sets 1340 and 1350 are referred to in the claims as a plurality of gear members.

Planetary gear set 1320 includes a sun gear member 1322, a ring gear member 1324 and carrier member 1329. A plurality of pinion gears 1327 are rotatably supported on the carrier member 1329 and disposed in meshing relationship with both the sun gear member 1322 and the ring gear member 1324.

Planetary gear set 1330 includes a sun gear member 1332, a ring gear member 1334 and a carrier member 1339. A plurality of pinion gear 1337 are rotatably supported on the carrier member 1339 and disposed in meshing relationship with both the sun gear member 1332 and the ring gear member 1334.

Planetary gear set 1340 includes a sun gear member 1342, a ring gear member 1344 and a carrier member 1349. A plurality of pinion gears 1347 are rotatably supported on the carrier member 1349 and disposed in meshing relationship with both the sun gear member 1342 and the ring gear member 1344.

The planetary gear set 1350 includes a sun gear member 1352, a ring gear member 1354 and a carrier member 1359. A plurality of pinion gears 1357 are rotatably supported on the carrier member 1359 and disposed in meshing relationship with both the sun gear member 1352 and the ring gear member 1354.

The input shaft 17 is continuously connected with the ring gear member 1354. The output shaft 19 is continuously connected with the carrier member 1329 and therefore also with the ring gear member 1334 via the interconnecting member 1378. The carrier member 1359 is continuously connected with the ring gear member 1344 via the interconnecting member 1370. The sun gear 1352 is continuously connected to the housing 1380. The carrier member 1349 is continuously connected with the carrier member 1339 via the interconnecting member 1376. The ring gear member 1334 is continuously connected with the carrier member 1329 via the interconnecting member 1378. The sun gear member 1332 is continuously connected with the sun gear member 1322 via the interconnecting member 1379.

With respect to the claims, the first gear member of the plurality of gear members is the ring gear member 1354, the second gear member of the plurality of gear members is the carrier member 1349, and the third gear member of the plurality of gear members is the ring gear member 1344.

The carrier member 1359 and the ring gear member 1344 are selectively connectable with the sun gear members 1322 and 1332 via engagement of the clutch B. The ring gear member 1354 is selectively connectable with the sun gear members 1322 and 1332 via engagement of the clutch C. The ring gear member 1324 is selectively connectable with the transmission housing 1380 via engagement of the brake MI. The sun gear member 1342 is selectively connectable with the transmission housing 1380 via engagement of the brake MII. The carrier member 1349 is selectively connectable with the sun gear members 1322 and 1332 as well as the carrier member 1339 via engagement of the clutch MIII. The carrier member 1339 is selectively connectable with the transmission housing 1380 via engagement of the brake REV. This also connects the carrier member 1349 with the transmission housing 1380 via the interconnecting member 1376.

Referring to the chart of FIG. 24, the engagement schedule for the torque-transmitting mechanisms of the transmission 1314 of FIG. 23 to achieve seven forward speed ratios and two reverse speed ratios is provided. Torque ratios as well as ratio steps associated with the speed ratios are listed. Speed ratios are indicated by the numbers 1-7, R2 and R1. The first and second forward speed ratios are first modal speed ratios (because the brake MI is engaged with the input torque-transmitting mechanisms B and C, respectively) to establish a first mode. The third forward speed ratio is a first transition speed ratio. The fourth forward speed ratio is a second modal speed ratio because brake MII is engaged with clutch C thereby establishing a second mode. The fifth forward speed ratio is a second transition speed ratio. The sixth and seventh forward speed ratios are third modal speed ratios (because the clutch MIII is engaged with the input torque-transmitting mechanisms B and C, respectively) to establish the third mode. The engagement schedule depicted in FIG. 23 involves single transition shifts. Additionally, the first forward ratio as well as the first reverse speed ratio provide a deep start ratio. Also, the highest speed ratio (indicated at 7 in the chart of FIG. 24) is a direct ratio. Thus, seven forward speed ratios are provided with low internal speeds, as there are no overdrive ratios. Transmission 1314 is designed to provide the close ratio steps listed in FIG. 24. The listed torque ratios and ratio steps result from the following ring gear/sun gear tooth ratio of the transmission 1314 of FIG. 23: the ring gear/sun gear tooth ratio of the planetary gear set 1320 is 3.0; the ring gear/sun gear tooth ratio of the planetary gear set 1330 is 3.8; the ring gear/sun gear tooth ratio of the planetary gear set 1340 is 2.88; and the ring gear/sun gear tooth ratio of the planetary gear set 1350 is 2.88.

In the transmission 1314 of FIG. 23, application of the brake REV and the brake MI provides a lockout feature to prevent rotation of the output member 19 on steep grades. The lockout feature functions in the same manner as that described with respect to the lockout feature of FIG. 2

While the best modes for carrying out the invention have been described in detail, those familiar with the art to which this invention relates will recognize various alternative designs and embodiments for practicing the invention within the scope of the appended claims.

The invention claimed is:

1. An automatic transmission comprising:
   first and second planetary gear sets each having a first member, a second member and a third member;
   a first modal torque-transmitting mechanism selectively engagable to connect one of said members of said first planetary gear set with a stationary member;
   a second modal torque-transmitting mechanism selectively engagable to establish power flow to a member of said second planetary gear set;
   a third modal torque-transmitting mechanism selectively engagable to connect any two members of one of said first and second planetary gear sets; and
   a first and a second input torque-transmitting mechanism separately selectively engagable to establish power flow at a different member of one of said first and second planetary gear sets than said member of said second planetary gear set at which power flow is established via engagement of said second modal torque-transmitting mechanism;
   wherein a speed of said different member (i) increases as said first and second input torque-transmitting mechanisms are engaged in successive order while said first modal torque-transmitting mechanism is also engaged, (ii) then decreases as at least one of the first and second input torque-transmitting mechanisms is engaged while said second modal torque-transmitting mechanism is also engaged, and (iii) then increases as the first and second input torque-transmitting mechanisms are engaged in successive order while said third modal torque-transmitting mechanism is also engaged, respectively.

2. The transmission of claim 1, wherein said first member of said first planetary gear set is continuously connected with said first member of said second planetary gear set, wherein said second member of said first planetary gear set is continuously connected with said second member of said second planetary gear set; and
   wherein said first modal torque-transmitting mechanism is selectively engagable to connect one of said second and third members of said first planetary gear set with said stationary member.

3. The transmission of claim 1, further comprising a reverse torque-transmitting mechanism selectively engagable to connect one of said members of said second planetary gear set with said stationary member;
   wherein said first and second input torque-transmitting mechanisms are engagable in successive order while said reverse torque-transmitting mechanism is also engaged to establish different reverse speed ratios between an input member and a output member.

4. The transmission of claim 3, wherein engagement of both said first modal torque-transmitting mechanism and said reverse torque-transmitting mechanism prevents rotation of said output member, thus preventing rolling on steep grades.

5. The transmission of claim 1, further comprising:
   an input member; and
   an output member;
   wherein said first and second input torque-transmitting mechanisms are engagable in successive order while said first modal torque-transmitting mechanism is also engaged to establish respectively increasing first modal speed ratios between said input member and said output member, in reverse order while said second modal torque-transmitting mechanism is also engaged to establish respectively increasing second modal speed ratios between said input member and said output member, and in successive order while said third modal torque-transmitting mechanism is also engaged to establish respectively increasing third modal speed ratios between said input member and said output member.

6. The transmission of claim 5, wherein said first and said second modal torque-transmitting mechanisms are simultaneously engagable to establish a first transition speed ratio between said input member and said output member, with a single transition shift between said first transition speed ratio and both of said first and second modal speed ratios, said first transition speed ratio having a numerical value greater than said first modal speed ratios and less than said second modal speed ratios.

7. The transmission of claim 5, wherein said second modal torque-transmitting mechanism and said third modal torque-transmitting mechanism are simultaneously engagable to establish a second transition speed ratio between said input member and said output member, with a single transition shift between said second transition speed ratio and both of said second and third modal speed ratios, said second modal torque-transmitting mechanism having a numerical value greater than said second modal speed ratios and less than said third modal speed ratios.

8. The transmission of claim 5, further comprising:
   a third input torque-transmitting mechanism selectively engagable to establish power flow at said different member of one of said first and second planetary gear sets;
   wherein said third input torque-transmitting mechanism is engagable with said first modal torque-transmitting mechanism to establish another first modal speed ratio, with said second modal torque-transmitting mechanism to establish another second modal speed ratio and with said third modal torque-transmitting mechanism to establish another third modal speed ratio; and wherein said another first modal speed ratio is less than all of said second modal speed ratios and said another second modal speed ratio is less than all of said third modal speed ratios.

9. An automatic transmission comprising:

an input member;

an output member;

first and second planetary gear sets each having a first member, a second member and a third member; wherein one of said members of said first planetary gear set is continuously connected with said output member;

a plurality of gear members including a first gear member continuously connected with said input member, a second gear member continuously connected with one of said members of one of said first and second planetary gear sets, and a third gear member continuously connected or selectively connectable with a different one of said members of one of said first and second planetary gear sets;

a first modal torque-transmitting mechanism selectively engagable to connect one of said members of said first planetary gear set with a stationary member;

a second modal torque-transmitting mechanism;

a third modal torque-transmitting mechanism selectively engagable to connect any two of said members of one of said first and said second planetary gear sets; and a first and a second input torque-transmitting mechanism each separately selectively engagable to connect a respective different one of said plurality of gear members with another one of said plurality of gear members, with said input shaft or with a stationary member, said first and second input torque-transmitting mechanisms being engagable in successive order while said first modal torque-transmitting mechanism is also engaged to establish respectively increasing first modal speed ratios between said input member and said output member, one of which is engagable while said second modal torque-transmitting mechanism is also engaged to establish a second modal speed ratio, or both of which are engagable in reverse order while said second modal torque-transmitting mechanism is also engaged to establish respectively increasing second modal speed ratios between said input member and said output member, and being engagable in successive order while said third modal torque-transmitting mechanism is also engaged to establish respectively increasing third modal speed ratios between said input member and said output member.

10. The transmission of claim 9, wherein a speed of said member of one of said first and second planetary gear sets continuously connected with said second gear member increases during successive first modal speed ratios, decreases during successive second modal speed ratios and increases during successive third modal speed ratios.

11. The transmission of claim 9, wherein said first and said second modal torque-transmitting mechanisms are simultaneously engagable to establish a first transition speed ratio between said input member and said output member, with a single transition shift between said first transition speed ratio and both of said first and second modal speed ratios, and having a numerical value greater than said first modal speed ratios and less than said second modal speed ratios.

12. The transmission of claim 9, wherein said second modal torque-transmitting mechanism and said third modal torque-transmitting mechanism are simultaneously engagable to establish a second transition speed ratio between said input member and said output member, with a single transition shift between said second transition speed ratio and both of said second and third modal speed ratios, and having a numerical value greater than said second modal speed ratios and less than said third modal speed ratios.

13. The transmission of claim 9, wherein said first member of said first planetary gear set is continuously connected with said first member of said second planetary gear set, wherein said second member of said first planetary gear set is continuously connected with said second member of said second planetary gear set; and wherein said first modal torque-transmitting mechanism is selectively engagable to connect one of said second and third members of said first planetary gear set with said stationary member.

14. The transmission of claim 9, further comprising:

a third input torque-transmitting mechanism selectively engagable to connect a respective different one of said plurality of gears members than that connected via engagement of said first or said second torque-transmitting mechanism with another one of said plurality of gear members, with said input shaft or with said stationary member;

wherein said third input torque-transmitting mechanism is engagable with said first modal torque-transmitting mechanism to establish another first modal ratio, with said second modal torque-transmitting mechanism to establish another second modal speed ratio and with said third modal torque-transmitting mechanism to establish another third modal speed ratio; and wherein said another first modal speed ratio is less than all of said second modal speed ratios, and wherein said another second modal speed ratio is less than all of said third modal speed ratios.

15. The transmission of claim 9, further comprising:

a reverse torque-transmitting mechanism selectively engagable to connect one of said members of said second planetary gear set with said stationary member; and wherein said first and second input torque-transmitting mechanisms are engagable in successive order while said reverse torque-transmitting mechanism is also engaged to establish different reverse speed ratios between said input member and said output member.

16. The transmission of claim 15, wherein engagement of both of said first modal torque-transmitting mechanism and said reverse torque-transmitting mechanism prevents rotation of said output member, thus preventing rolling on steep grades.

17. The transmission of claim 9, wherein said plurality of gear members include at least two additional planetary gear sets.

18. The transmission of claim 9, further comprising:

at least one countershaft offset from said input and output members, wherein at least some of said plurality of gear members are connected for common rotation with said countershaft.

19. The transmission of claim 9, wherein a highest of said third modal speed ratios is a direct drive ratio.

20. An automatic transmission comprising:

first and second planetary gear sets each having a first member, a second member and a third member;

a first modal torque-transmitting mechanism selectively engagable to connect one of said members of said first planetary gear set with a stationary member;

a second modal torque-transmitting mechanism selectively engagable to establish power flow to a member of said second planetary gear set;

a third modal torque-transmitting mechanism selectively engagable to connect any two members of one of said first and second planetary gear sets;

a first and a second input torque-transmitting mechanism separately selectively engagable to establish power flow at a different member of one of said first and second planetary gear sets than said member of said second planetary gear set at which power flow is established via engagement of said second modal torque-transmitting mechanism; and a reverse torque-transmitting mechanism selectively engagable to connect one of said members of said second planetary gear set with said stationary member;

wherein a speed of said different member (i) increases as said first and second input torque-transmitting mechanisms are engaged in successive order while said first modal torque-transmitting mechanism is also engaged, (ii) then decreases as at least one of the first and second input torque-transmitting mechanisms is engaged while said second modal torque-transmitting mechanism is also engaged, and (iii) then increases as the first and second input torque-transmitting mechanisms are engaged in successive order while said third modal torque-transmitting mechanism is also engaged, respectively;

wherein said first and second input torque-transmitting mechanisms are engagable in successive order while said reverse torque-transmitting mechanism is also engaged to establish different reverse speed ratios between said input member and said output member; and wherein engagement of both said first modal torque-transmitting mechanism and said reverse torque-transmitting mechanism prevents rotation of said output member, thus preventing rolling on steep grades.

* * * * *